(12) United States Patent
Exnar et al.

(10) Patent No.: US 8,097,361 B2
(45) Date of Patent: Jan. 17, 2012

(54) NANOTUBE WIRING

(75) Inventors: Ivan Exnar, Itingen (CH); Shaik Mohammed Zakeeruddin, Renens (CH); Michael Gratzel, St-Sulpice (CH); Ladislav Kavan, Praha (CZ)

(73) Assignee: Dow Global Technologies LLC, Midland, MI (US)

( * ) Notice: Subject to any disclaimer, the term of this patent is extended or adjusted under 35 U.S.C. 154(b) by 356 days.

(21) Appl. No.: 12/445,128

(22) PCT Filed: Oct. 18, 2007

(86) PCT No.: PCT/IB2007/054246
§ 371 (c)(1),
(2), (4) Date: May 8, 2009

(87) PCT Pub. No.: WO2008/047324
PCT Pub. Date: Apr. 24, 2008

(65) Prior Publication Data
US 2010/0068621 A1 Mar. 18, 2010

(30) Foreign Application Priority Data

Oct. 18, 2006 (WO) .................. PCT/IB2006/053833

(51) Int. Cl.
*H01M 4/60* (2006.01)
*H01M 4/13* (2006.01)
*D01F 9/12* (2006.01)
(52) U.S. Cl. ..................... 429/212; 429/209; 423/447.1; 977/750
(58) Field of Classification Search .................. 429/212, 429/209, 306, 307, 105, 188, 199; 29/623.1; 423/447.1; 977/750
See application file for complete search history.

(56) References Cited

U.S. PATENT DOCUMENTS

| | | | |
|---|---|---|---|
| 4,857,423 A | 8/1989 | Abraham et al. | |
| 4,869,977 A | 9/1989 | Connolly et al. | |
| 5,536,599 A | 7/1996 | Alamgir et al. | |
| 2009/0305132 A1* | 12/2009 | Gauthier et al. | 429/207 |

FOREIGN PATENT DOCUMENTS

| | | |
|---|---|---|
| EP | 0 746 050 | 12/1996 |
| EP | 1 843 426 | 10/2007 |
| WO | WO 2006/131873 | 12/2006 |

OTHER PUBLICATIONS

S. W. Boettcher, M. H. Bartl, J. G. Hu, G. D. Stucky. Structural Analysis of Hybrid Titania-Based Mesostructured Composites, JACS 2005, 127, 9721-9730.*
D. A. Britz, A. N. Khlobystov. Noncovalent interactions of molecules with single walled carbon nanotubes, Chem. Soc. Rev. 2006, 35, 637-659.*
S.-Y. Chung, J. T. Bloking, Y.-M. Chiang. Electronically conductive phospho-olivines as lithium storage electrodes, Nature Materials 2002, 1, 123-128.*
J. R. Dahn, J. Jiang, L. M. Moshurchak, M. D. Fleischauer, C. Buhrmester, L. J. Krause. High-Rate Overcharge Protection of LiFePO4-Based Li-Ion Cells Using the Redox Shuttle Additive 2,5-Ditertbutyl-1,4-dimethoxybenzene, J. Electrochem. Soc. 2005, 152(6), A1283-A1289.*
C. Delacourt, P. Poizot, M. Morcrette, J.-M. Tarascon, and C. Masquelier. One-Step Low-Temperature Route for the Preparation of Electrochemically Active LiMnPO4 Powders, Chem. Mater. 2004, 16, 93-99.*
C. Delacourt, L. Laffont, R. Bouchet, C. Wurm, J.-B. Leriche, M. Morcrette, J.-M. Tarascon, C. Masquelier. Toward Understanding of Electrical Limitations (Electronic, Ionic) in LiMPO4 (M = Fe, Mn) Electrode Materials, J. Electrochem. Soc. 2005, 152(5), A913-A921.*
R. Dominko, M. Bele, M. Gaberscek, M. Remskar, D. Hanzel, J. M. Goupil, S. Pejovnik , J. Jamnik. Porous olivine composites synthesized by sol-gel technique, J. Power Sources 2006, 153, 274-280.*
B. Ellis, L. K. Perry, D. H. Ryan, L. F. Nazar. Small Polaron Hopping in LixFePO4 Solid Solutions: Coupled Lithium-Ion and Electron Mobility, JACS 2006, 128, 11416-11422.*
L. Kavan, I. Exnar, J, Cech, M. Graetzel. Enhancement of Electrochemical Activity of LiFePO4 (olivine) by Amphiphilic Ru-bipyridine Complex Anchored to a Carbon Nanotube, Chem. Mater. 2007, 19, 4716-4721.*
J. Ma, Q.-Z. Qin. Electrochemical performance of nanocrystalline LiMPO4 thin-films prepared by electrostatic spray deposition, J. Power Sources 2005, 148, 66-71.*
T. Nakamura, Y. Miwa, M. Tabuchi, Y. Yamada. Structural and Surface Modifications of LiFePO4 Olivine Particles and Their Electrochemical Properties, J. Electrochem. Soc. 2006, 153(6), A1108-A1114.* M. K. Nazeeruddin, P. Pechy, T. Renouard, S. M. Zakeeruddin, R. Humphry-Baker, P. Comte, P.I Liska, L. Cevey, E. Costa, V. Shklover, L. Spiccia, G. B. Deacon, C. A. Bignozzi, M. Gratzel. Engineering of Efficient Panchromatic Sensitizers for Nanocrystalline TiO2-Based Solar Cells, JACS 2001, 123, 1613-1624.*
A. K. Padhi, K. S. Nanjundaswamy, J. B. Goodenough. Phospho-olivines as Positive-Electrode Materials for Rechargeable Lithium Batteries, J. Electrochem. Soc. 1997, 144(4), 1188-1194.*
P. S. Herle, B. Ellis, N. Coombs, L. F. Nazar. Nano-network electronic conduction in iron and nickel olivine phosphates, Nature Materials 2004, 3, 147-152.*
P. Wang, S. M. Zakeeruddin, P. Comte, R. Charvet, R. Humphry-Baker, M. Gratzel. Enhance the Performance of Dye-Sensitized Solar Cells by Co-grafting Amphiphilic Sensitizer and Hexadecylmalonic Acid on TiO2 Nanocrystals, J. Phys. Chem B. 2003, 107, 14336-14341.*

(Continued)

*Primary Examiner* — Jerry Lorengo
*Assistant Examiner* — Carlos Barcena

(57) ABSTRACT

This invention concerns a novel method for surface derivatization of electrode materials for Li-ion batteries. The derivatization is based on adsorption of a composite assembly consisting of amphiphilic redox active molecule attached to single walled carbon nanotube (SWCNT). Its role consists in the enhancement of electronic conductivity of electrode materials, such as phosphate olivines, without requesting any significant increase of the electrode volume and mass. The SWCNT is linked to the redox molecule via non-covalent or covalent interaction with the hydrophobic part of the molecule or electrostatic interaction. The hydrophilic part of the molecule serves as the anchoring site for surface modification of the electrode active material. The redox potential of the molecule is close to the redox potential of the electrode active material. The adsorbed assembly of redox-molecule & SWCNT thus improves the charge transfer from a current collector to the electrode active material.

20 Claims, 9 Drawing Sheets

OTHER PUBLICATIONS

Figure 1:
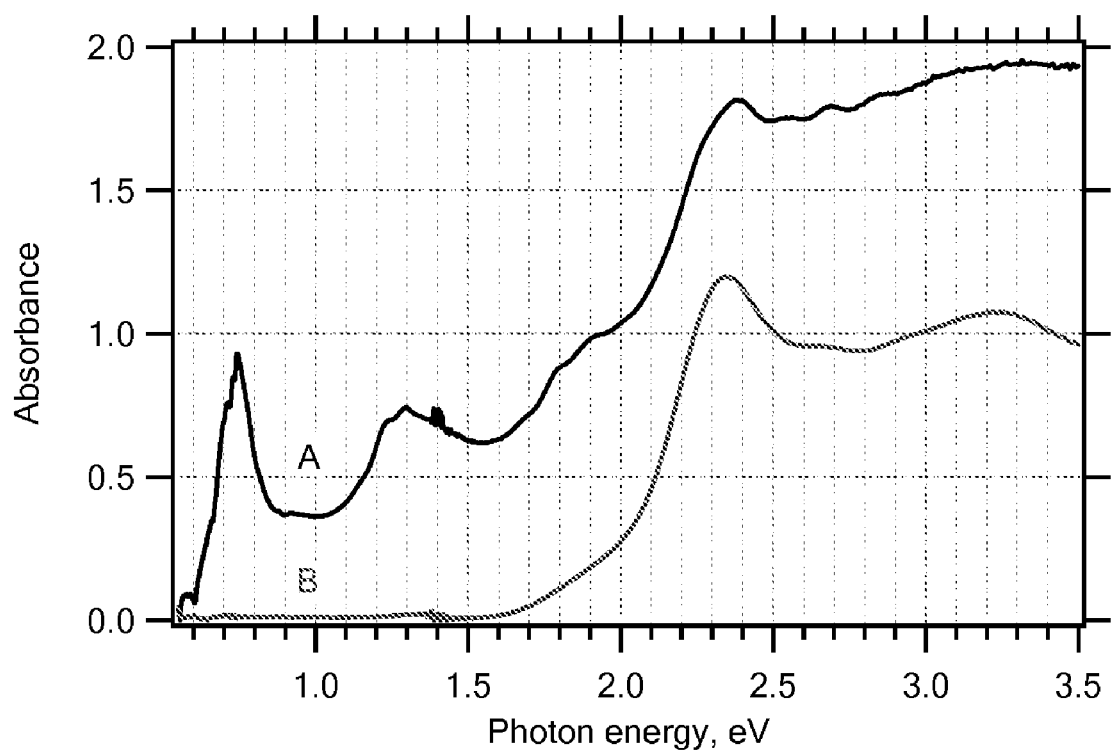

D. Wang, H. Li, Z. Wang, X. Wu, Y. Sun, X. Huang, L. Chen. New solid-state synthesis routine and mechanism for LiFePO4 using LiF as lithium precursor, J. Solid State Chem. 2004, 177, 4582-4587.*

P. Wang, B. Wenger, R. Humphry-Baker, J.-E. Moser, J. Teuscher, W. Kantlehner, J. Mezger, E. V. Stoyanov, S. M. Zakeeruddin, M. Gratzel. Charge Separation and Efficient Light Energy Conversion in Sensitized Mesoscopic Solar Cells Based on Binary Ionic Liquids, JACS 2005, 127, 6850-6856.*

Q. Wang, S. M. Zakeeruddin, Md. K. Nazeeruddin, R. Humphry-Baker, M. Gratzel. Molecular Wiring of Nanocrystals: NCS-Enhanced Cross-Surface Charge Transfer in Self-Assembled Ru-Complex Monolayer on Mesoscopic Oxide Films, JACS 2006, 128, 4446-4452.*

Q. Wang, N. Evans, S. M. Zakeeruddin, I. Exnar, M. Gratzel. Molecular Wiring of Insulators: Charging and Discharging Electrode Materials for High-Energy Lithium-Ion Batteries by Molecular Charge Transport Layers, JACS 2007, 129, 3163-3167.*

A. Yamada, M. Hosoya, S.-C. Chung, Y. Kudo, K. Hinokuma, K.-Y. Liu, Y. Nishi. Olivine-type cathodes Achievements and problems, J. Power Sources 2003, 119-121, 232-238.*

M. Yonemura, A. Yamada, Y. Takei, N. Sonoyama, R. Kanno. Comparative Kinetic Study of Olivine LixMPO4 .M 5 Fe, Mn, J. Electrochem. Soc. 2004, 151(9), A1352-A1356.*

F. Zhou, K. Kang, T. Maxisch, G. Ceder, D. Morgan. The electronic structure and band gap of LiFePO4 and LiMnPO4, Solid State Comm. 2004, 132, 181-186.*

International Search Report for PCT/IB2007/054246, mailed Apr. 4, 2009.

Written Opinion of the International Searching Authority for PCT/IB2007/054246, mailed Apr. 4, 2009.

Buhrmester, Claudia et al., "Phenothiazine Molecules", Journal of the Electrochemical Society, vol. 152, No. 2, (Dec. 23, 2005), pp. A288-A294.

* cited by examiner

NANOTUBE WIRING

This application is the U.S. national phase of International Application No. PCT/IB2007/054246, filed 18 Oct. 2007, which designated the U.S. and claims priority to PCT/IB2006/053833, filed 18 Oct. 2006, the entire contents of each of which are hereby incorporated by reference.

DESCRIPTION OF PRIOR ART

The lithium insertion materials in commercial electrochemical cells comprise 2~25 wt. %, typically 10 wt. % conductive additives. These conductive agents do not participate in the redox reactions and therefore represent inert mass reducing the energy storage capacity of the electrode. This situation is especially severe as the lithium insertion material or its de-intercalated state has very poor electronic conductivity as for olivine cathode materials. The advent of olivine phosphates as novel cathode materials for Li-ion batteries stems from the pioneering work of Goodenough et al.[1], who had first reported on two generic structures, viz. $LiFePO_4$ and $LiMnPO_4$ as well as the mixed phases, $LiFe_xMn_{1-x}PO_4$ (0<x<1). Both materials are very poor electronic conductors; the reported conductivities of $LiFePO_4$ and $LiMnPO_4$ are ($\sim 10^{-8}$ to $10^{-9}$) S/cm and (<$10^{-10}$ to $3 \cdot 10^{-9}$) S/cm, respectively[2-4]. Ceder et al.[5] have measured the optical band gap of $LiFePO_4$ to be 3.8-4.0 eV, which would account for negligible concentration of intrinsic charge carriers. Therefore the electronic charge cannot be transported by delocalized electrons in the olivine conduction band, but via localized polarons at the transition metal, whose mobility is a thermally activated (hoping) process. Recently, Nazar et al.[6] have pointed out that the polaron hopping is strongly correlated with the $Li^+$ transport. Enhancement of the electronic conductivity of $LiMPO_4$ (M=Mn, Fe) requires proper engineering of the material morphology[2,7-10] and surface modification, while the carbon coating is the obvious strategy[4,8,10-13]. An alternative pathway is based on the doping of $LiFePO_4$ by supervalent cations, such as $Zr^{4+}$ and $Nb^{5+}$ at the $Li^+$ site[14]. Eventually, the conductive coating on $LiFePO_4$ olivine might not be a pure elemental carbon, but phosphides or phosphocarbides as demonstrated by Nazar et al.[3] by the EDX elemental map of grain boundaries. In this particular case, the phosphides $Fe_2P$ and $Fe_{75}P_{15}C_{10}$ were assumed, but the presence of elemental carbon can also be convincingly demonstrated by Raman spectroscopy[8].

In the conventional solid state synthesis of $LiMPO_4$ (M=Mn, Fe), carbon is added to the precursor mixture composed of a stoichiometric amounts of the corresponding Li-, M- and $PO_4^{3-}$ salts[4,11]. During the synthesis, carbon simultaneously acts as a reductant, avoiding the formation of $M^{3+}$ and also as a separator, blocking the growth of crystals[11]. The suppression of crystal growth by carbon manifests itself by the formation of particles in the range 60-100 nm. Li et al.[11] reported that $LiMnPO_4$, which was synthesized in this way, delivered 140 mAh/g at 0.28 mA/cm². Unfortunately this promising result was not reproduced by others[4,13], and the cited paper[11] remains controversial.

$LiMPO_4$ (M=Mn, Fe) can also be prepared at low-temperatures by direct precipitation from aqueous solutions[2,10,13]. In this case, the carbon coating can be made via subsequent ball-milling with acetylene black[10,13]. This strategy provided particle sizes between 100-200 nm and BET areas 23-13 m²/g[13]. Obviously, the particle sizes of low-temperature ("chimie-douce") olivine[2,10,13] are, actually, similar to those of olivine from the solid state reaction with carbon additive[4]. Presumably, the smallest particles of $LiMnPO_4$ (ca. 50 nm) were prepared in thin films by electrostatic spray deposition[9]. However, their discharge capacities were found to be only ca. 20 mAh/g at slow cyclic voltammetry[9]. We could speculate that this accounts for uncontrolled carbon coating (if any) in this particular case. The optimized carbon-coated $LiMnPO_4$ materials with particle sizes around 130 nm exhibited 156 mAh/g at C/100 and 134 mAh/g at C/10[10].

Obviously, the slow polaron mobility in $LiMPO_4$ is a fundamental problem, which can be, presumably minimized by decreasing the particle size and optimized decoration of particles with conductive carbon.

In the PCT/IB2006/051781 is described novel strategy for charging/discharging of virtually insulating cathode materials like $LiMPO_4$ called molecular wiring. It is based on an efficient cross surface electron/hole transport in self-assembled redox active molecules adsorbed on the $LiMPO_4$ surface. In the European patent application 06 112 361.8 is described a similar method, called redox targeting of cathode materials. It adopts the same philosophy of charge transport by redox-active molecules, but the molecules do not act here in the form of adsorbed monolayer, but are dissolved in the electrolyte solution. This concept is attractive due to larger currents, which can be drawn in the redox targeting process, but the redox targeting is complicated by a need of a special separator between anode and cathode. This separator must allow the fast $Li^+$ transport, but it must simultaneously block the transport of redox-targeting molecules to the anode.

FIELD OF THE INVENTION

This invention concerns electrochemically addressable lithium insertion electrode systems for electrochemical cells using non-aqueous organic electrolytes, quasi-solid gel electrolytes, solid electrolytes, or the like and in particular the use of said electrolytes in combination with porous electrode materials, i.e. doped or non-doped nanoparticles or sub-microparticles of lithium insertion materials and redox active compounds.

This invention also concerns the configuration of the electrochemical cell containing the redox active compounds attached to SWCNT.

Here we show a novel concept called nanotube wiring, which is based on anchoring of the redox relay—charge transport by redox active molecules—attached to SWCNT, which can improve the conductivity of the cathode material in Li-ion battery. The amphiphilic redox active compound contains hydrophobic and hydrophilic parts in the molecule; hence it can act as surfactants dispersing SWCNT. The hydrophobic part (e.g. aliphatic chain) serves for anchoring of SWCNT via non-covalent bonds. The hydrophilic part is represented by either ionic or uncharged polar functional groups (e.g. —COOH), which interact with the surface of the electrode active material. Because the adsorbed assembly does not occupy any significant extra volume of the whole electrode system, the electrode composite provides excellent energy density of the electrochemical cell. This concept is attractive due to larger currents, which can be drawn similar as in the redox targeting process, described in the European patent application 06 112 361.8 but comparing to described process we do not need of a special separator between anode and cathode. The novel idea uses SWCNT modified by redox relay, which is further adsorbed on the electrode active material. The redox relay is thus localized on the electrode and cannot react with the opposite electrode.

SUMMARY OF THE INVENTION

It has been discovered that some amphiphilic redox active molecules interact to SWCNT can further anchor with the surface of electrode active material such as LiFePO$_4$ (olivine). The assembly of redox molecule and SWCNT thus covers the surface of the active material, forming an electrochemically addressable electrode system. For cathodic lithium insertion material upon positive polarization the donor redox active compound (D) will be oxidized at current corrector and charges (holes) will be transported from the current collector to the lithium insertion material by the oxidized form of the redox active compound (D$^+$). As the redox potential of the redox active compound is higher or matches closely the Fermi level of the lithium insertion material, D$^+$ will be reduced by the lithium insertion material. Electrons and lithium ions will be withdrawn from it during battery charging. By contrast, during the discharging process, the oxidized species are reduced at current collector and charges (electrons) are transported from the current collector to the lithium insertion material by the redox active compound (D). Lithium ions and electrons are injected into the solid, as the redox potential of the redox active compound is lower or matches closely the Fermi level of the lithium insertion material.

The cell is composed of two compartments, where the cathodic compartment comprises a cathodic lithium insertion material and redox active compound(s); the anodic compartment comprises an anodic lithium insertion material and redox active compound(s). These two compartments are separated by a separator. Compared to the whole electrode system, the redox active adsorbate does not occupy any significant extra volume of the whole electrode system. Hence with respect to prior art, the present invention allows reducing greatly the volume of the conductive additives resulting in a much improved energy storage density. The redox adsorbate is not soluble in the working electrolyte so the use of a special separator as described in the European patent application 06 112 361.8 is not necessary.

According to the present invention, a redox active molecule is attached to the SWCNT backbone by non-covalent bonding. A redox active centre (D) may be an organic compound or a metal complex having suitable redox potential as that of the battery material. In preferred configuration the redox active metal complex or organic compound (D) is localized between the SWCNT surface and the surface of electrode active material.

SWCNT-D-[M]   (I)

Wherein [M] represents schematically the electrode material

DEFINITIONS

As used herein, the term "lithium insertion material" refers to the material which can host and release lithium ions reversibly. If the materials lose electrons upon charging, they are referred to as "cathodic lithium insertion material". If the materials acquire electrons upon charging, they are referred to as "anodic lithium insertion material".

As used herein, the term "donor-type redox active compound" refers to those compounds that are present in the cathodic compartment of the cell, and act as molecular relay transporting charges between current collector and cathodic lithium insertion material upon charging/discharging. On the other hand, the term "acceptor-type redox active compound" refers to the molecules that present in the anodic compartment of the cell, and act as molecular relay transporting charges between current collector and anodic lithium insertion material upon charging/discharging.

DETAILED DESCRIPTION OF THE INVENTION

A redox active centre may be an organic compound or a metal complex having suitable redox potential as that of the lithium insertion material.

In a preferred configuration the redox active centre is of the type given below, D-[Π]-(Ral) or D-(Ral)   (II)

wherein -[Π]- represents schematically the π system of the aforesaid substituent, Ral represents an aliphatic substituent with a saturated chain portion bound to the π system, and wherein q represents an integer, indicating that -[Π]- may bear more than one substituent Ral.

The π system -[Π]- may be an unsaturated chain of conjugated double or triple bonds of the type

   (1)

   (2)

   (3)

wherein p is an integer from 0 to 20, wherein Rar is a H or monocyclic or oligocyclic aryl from C6 to C22, wherein -Ral is —R1 or —O—R1 or —N(R1)$_2$ or —NHR1 or

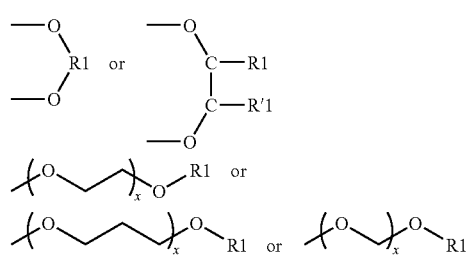

wherein R1, R'1 are same or different from —CH$_2$PO$_3$H$_2$, —CH$_2$CO$_2$H, —CH$_2$SO$_3$H, —CH$_2$CONHOH, —CH$_2$PO$_4$H$_2$, —CH$_2$SO$_4$H$_2$, x≧0, and 0<n<20.

According to a preferred embodiment, D is selected from benzol, naphtaline, indene, substituted triarylamine, fluorene, phenantrene, anthracene, triphenylene, pyrene, pentalene, perylene, indene, azulene, heptalene, biphenylene, indacene, phenalene, acenaphtene, fluoranthene, and heterocyclic compounds pyridine, pyrimidine, pyridazine, quinolizidine, quinoline, isoquinoline, quinoxaline, phtalazine, naphthyridine, quinazoline, cinnoline, pteridine, indolizine, indole, isoindole, carbazole, carboline, acridine, phenanthridine, 1,10-phenanthroline, thiophene, thianthrene, oxanthrene, and derivatives thereof, optionally be substituted.

According to a preferred embodiment, D is selected from structures of formula (1-11) given below:

(1) 

(2) 

(3) 

(4) 

(5) 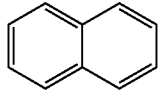

(6) 

(7) 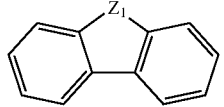

(8) 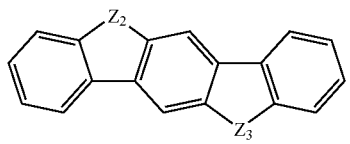

(9) 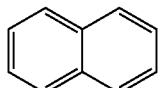

(10) 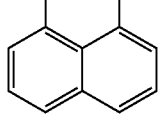

(11) 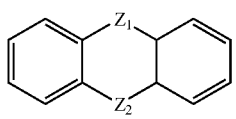

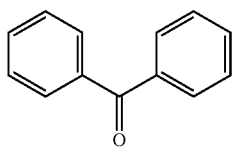

in which each of $Z^1$, $Z^2$ and $Z^3$ is the same or different and is selected from the group consisting of O, S, SO, $SO_2$, $NR^1$, $N^+(R^{1'})(R^{1''})$, $C(R^2)(R^3)$, $Si(R^{2'})(R^{3'})$ and $P(O)(OR^4)$, wherein $R^1$, $R^{1'}$ and $R^{1''}$ are the same or different and each is selected from the group consisting of hydrogen atoms, alkyl groups, haloalkyl groups, alkoxy groups, alkoxyalkyl groups, aryl groups, aryloxy groups, and aralkyl groups, which are substituted with at least one group of formula —$N^+(R^5)_3$ wherein each group $R^5$ is the same or different and is selected from the group consisting of hydrogen atoms, alkyl groups and aryl groups, $R^2$, $R^3$, $R^{2'}$ and $R^{3'}$ are the same or different and each is selected from the group consisting of hydrogen atoms, alkyl groups, haloalkyl groups, alkoxy groups, halogen atoms, nitro groups, cyano groups, alkoxyalkyl groups, aryl groups, aryloxy groups and aralkyl groups or $R^2$ and $R^3$ together with the carbon atom to which they are attached represent a carbonyl group, and $R^4$ is selected from the group consisting of hydrogen atoms, alkyl groups, haloalkyl groups, alkoxyalkyl groups, aryl groups, aryloxy groups and aralkyl groups.

Preferred p-type redox active compounds have the following structure:

Triarylamine Derivatives (III)
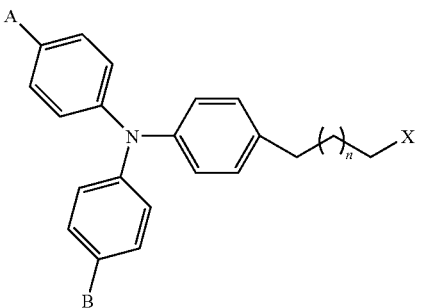

n=0 to 20

X=$PO_3H_2$ or $CO_2H$ or $SO_3H$ or CONHOH or $PO_4H_2$

A=F or Cl or Br I or $NO_2$ or COOR or Alkyl ($C_1$ to $C_{20}$) or $CF_3$ or COR or $OCH_3$ or H B=F or Cl or Br I or $NO_2$ or COOR or Alkyl ($C_1$ to $C_{20}$) or $CF_3$ or COR or $OCH_3$ A=B or A≠B (IV)
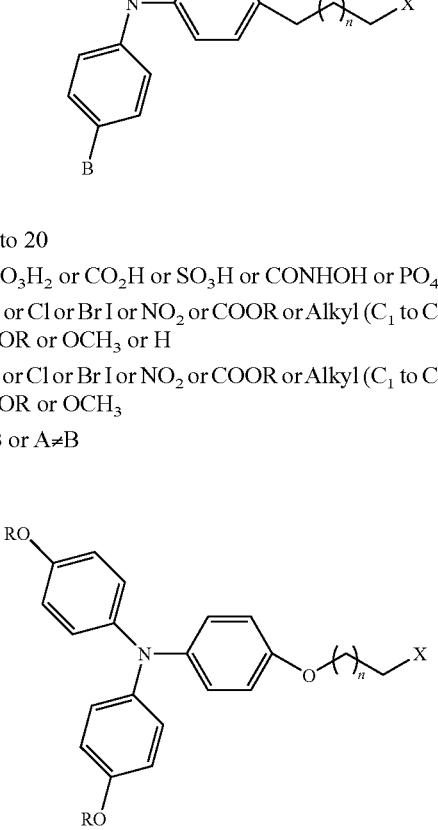

n=0 to 20

R=H Or $C_1$ to $C_{20}$

X=$PO_3H_2$ or $CO_2H$ or $SO_3H$ or CONHOH or $PO_4H_2$

Phenothiazine Derivatives, Carbazole Derivatives

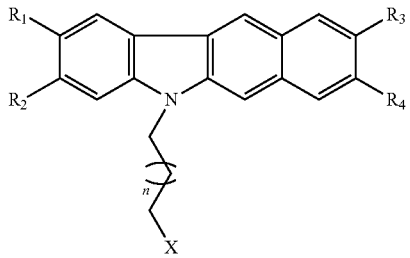
(V)

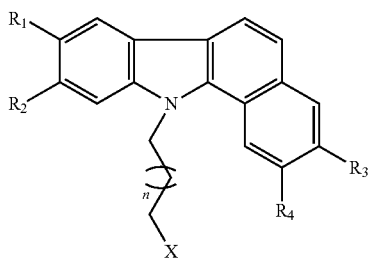
(VI)

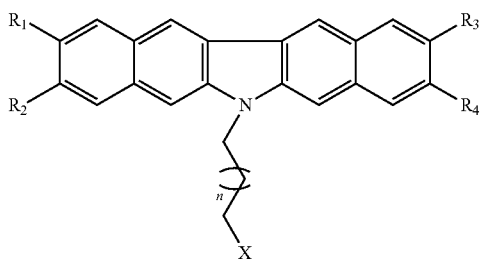
(VII)

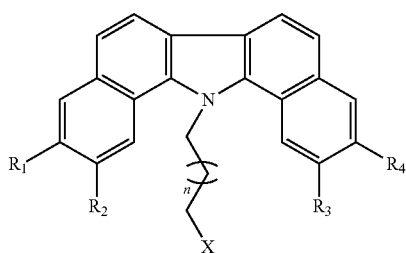
(VIII)

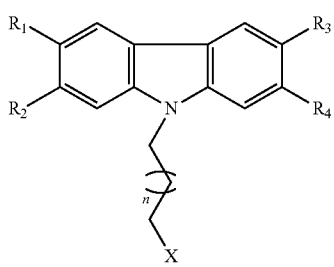
(IX)

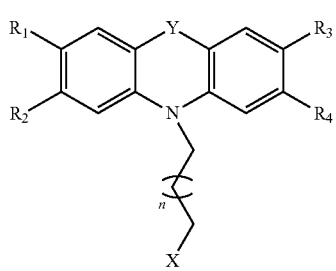
(X)

n=0 to 20
X=$PO_3H_2$ or $CO_2H$ or $SO_3H$ or CONHOH or $PO_4H_2$
Y=N or O or S
$R_1$, $R_2$, $R_3$, $R_4$ can be
F or Cl or Br I or $NO_2$ or COOR or Alkyl ($C_1$ to $C_{20}$) or $CF_3$ or COR or $OCH_3$ or H Pyridine N-Oxide Derivatives

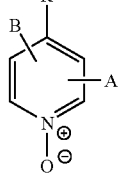
(XI)

Wherein A and B are same or different from H, OR, Cl, Br, F, I, NO2, CF3, COCF3, R is H or $(CH_2)_p$-$E_n$-$(CH_2)_m$-Acc (p=0 to 24, linear or branched or with cycles; n=0 to 24, m=0 to 24, linear or branched or with cycles; E is —CH=CH—, or —C≡C—, or —$OCH_2CH_2$—, and Acc is $PO_3H_2$ or $CO_2H$ or $SO_3H$ or CONHOH or $PO_4H_2$ or $SO_4H_2$ Phenothiazine Derivatives

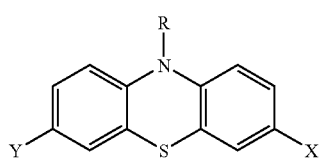
(XII)

Wherein X and Y are same or different from H, OR, Cl, Br, F, I, NO2, CF3, COCF3, R is H or $(CH_2)_p$-$E_n$-$(CH_2)_m$-Acc (p=0 to 24, linear or branched or with cycles; n=0 to 24, m=0 to 24, linear or branched or with cycles; E is —CH=CH—, or —C≡C—, or —$OCH_2CH_2$—, and Acc is $PO_3H_2$ or $CO_2H$ or $SO_3H$ or CONHOH or $PO_4H_2$ or $SO_4H_2$ Phenol Derivatives

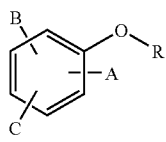
(XIII)

Wherein A, B and C are same or different from H, OR, Cl, Br, F, I, NO2, CF3, COCF3, linear or branched alkyl group from 1 to 20 carbon atoms, R is H or $(CH_2)_p$-$E_n$-$(CH_2)_m$-Acc (p=0 to 24, linear or branched or with cycles; n=0 to 24, m=0 to 24, linear or branched or with cycles; E is —CH=CH—, or —C≡C—, or —OCH$_2$CH$_2$—, and Acc is PO$_3$H$_2$ or CO$_2$H or SO$_3$H or CONHOH or PO$_4$H$_2$ or SO$_4$H$_2$ Alternatively a redox active centre may be a metal complex having suitable redox potential as that of the lithium insertion material.

In metal complexes as redox active centers, the preferred ligands coordinated to the metal, according to the invention are metal complexes having a formula selected from

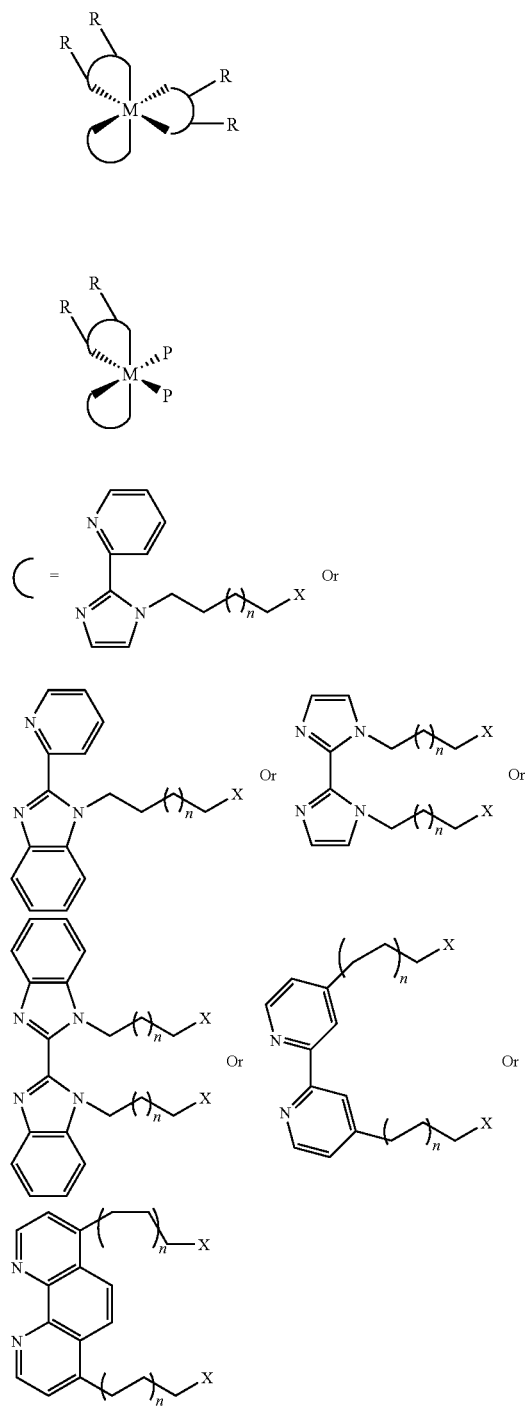

(XIV)

(XV)

wherein M=Fe or Ru or Os n=0 to 20

X=PO$_3$H$_2$ or CO$_2$H or SO$_3$H or CONHOH or PO$_4$H$_2$ or SO$_4$H$_2$

P=F or Cl or Br or I or NO$_2$ or CN or NCSe or NCS or NCO

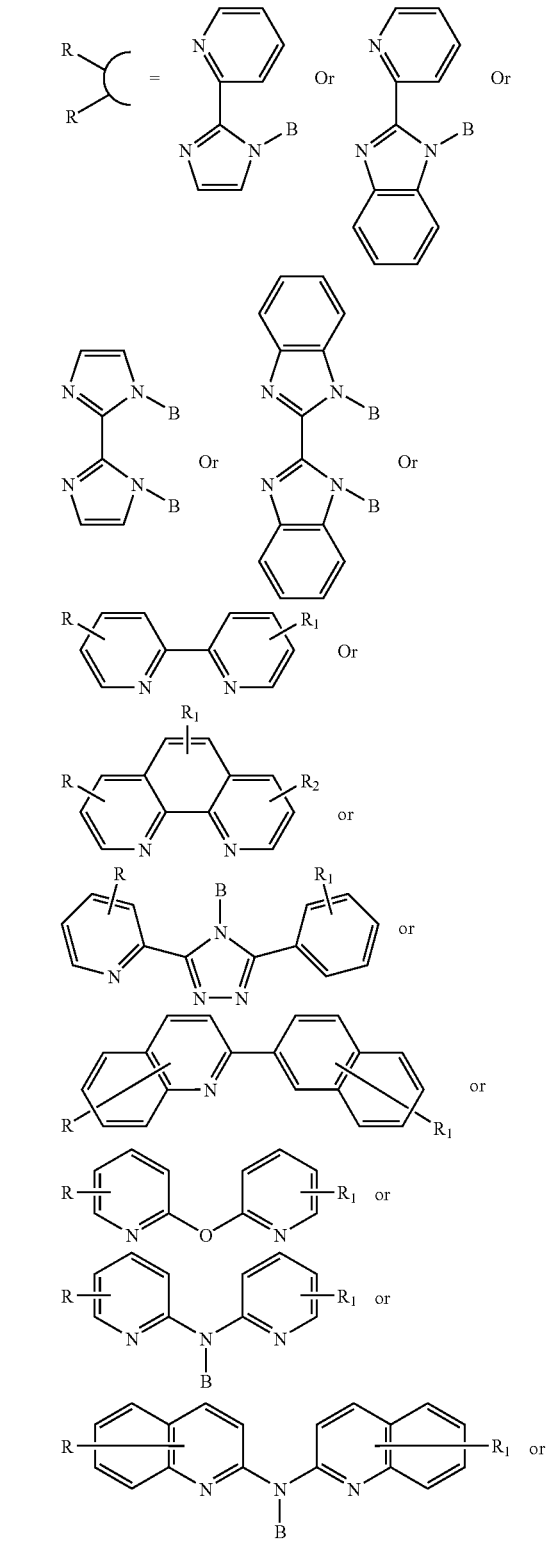

-continued

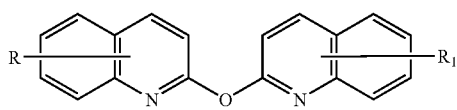

Wherein B=alkyl ($C_1$ to $C_{20}$) or H

R, $R_1$, $R_2$ is same or different from COORS or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is an alkyl ($C_1$ to $C_{20}$) or H) or comprises an additional π system located in conjugated relationship with the primary π system, the said substituent is of the type —R=[π]$_q$(Ral) or -(Ral)

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

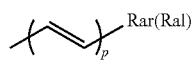 (1)

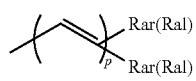 (2)

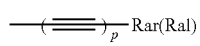 (3)

wherein p is an integer from 0 to 20, wherein Rar is a H or monocyclic or oligocyclic aryl from C6 to C22, wherein -Ral is a H or —R1 or —O—R1 or —N(R1)$_2$ or —NHR1 or

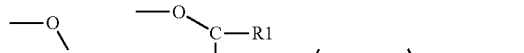

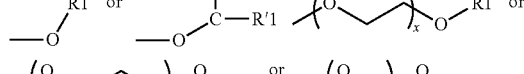

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20.

wherein the other one(s) of substituent(s) —R, —$R_1$, —$R_2$ is (are) the same or a different substituent of formula (1), (2) or (3), or is (are) selected from —H, —OH, —$R_3$, —$OR_3$, COOH, $COCF_3$, CN, Br, Cl, F, I, $CF_3$, or —N($R_3$)$_2$, wherein $R_3$ is a linear or branched alkyl of 1 to 20 carbon atoms.

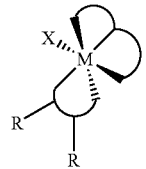

(XVI)

M=Fe or Ru or Os
X=F or Cl or Br or I or $NO_2$ or CN or NCSe or NCS or NCO

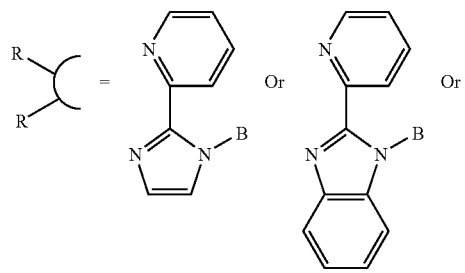

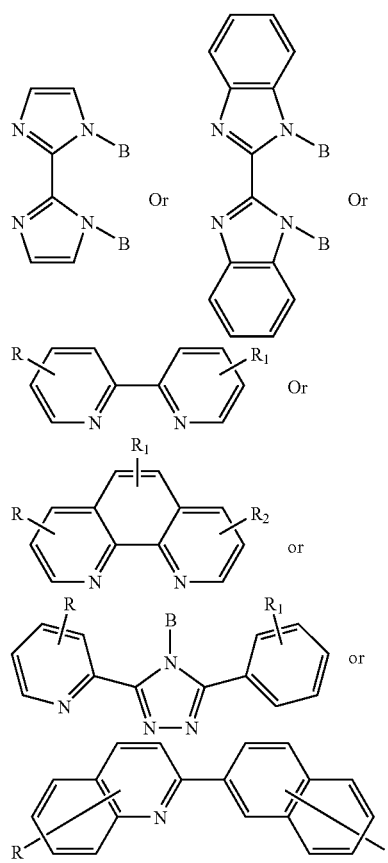

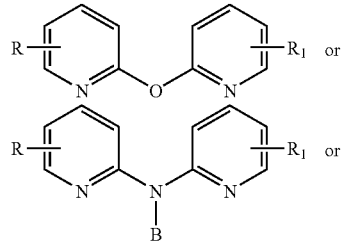

-continued

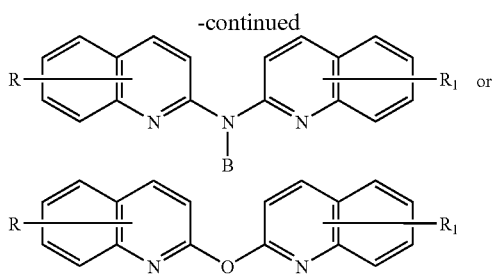

Wherein B=linear or branched alkyl ($C_1$ to $C_{20}$) or H

R, $R_1$, $R_2$ is same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is an alkyl ($C_1$ to $C_{20}$) or H) or comprises an additional π system located in conjugated relationship with the primary π system, the said substituent is of the type —R=—[π]—(Ral) or -(Ral)

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

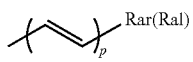 (1)

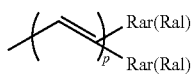 (2)

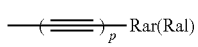 (3)

wherein p is an integer from 0 to 20, wherein Rar is a H or monocyclic or oligocyclic aryl from C6 to C22, wherein -Ral is a H or —R1 or —O—R1 or —N(R1)$_2$ or —NHR1 or

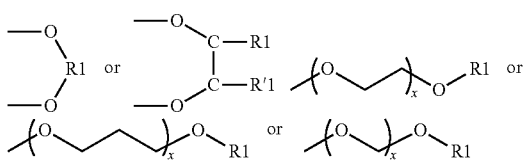

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20.

wherein the other one(s) of substituent(s) —R, —$R_1$, —$R_2$ is (are) the same or a different substituent of formula (1), (2) or (3), or is (are) selected from —H, —OH, —$R_3$, —$OR_3$, COOH, $COCF_3$, CN, Br, Cl, F, I, CF3, or —N($R_3$)$_2$, wherein $R_3$ is a linear or branched alkyl of 1 to 20 carbon atoms.

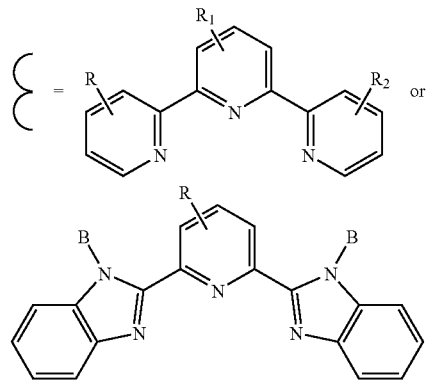

Wherein B=alkyl ($C_1$ to $C_{20}$) or H

R, $R_1$, $R_2$ may be same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H R, $R_1$, $R_2$ is same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is a linear or branched alkyl ($C_1$ to $C_{20}$) or H) or comprises an additional π system located in conjugated relationship with the primary π system, the said substituent is of the type —R=—[π]—(Ral) or -(Ral)

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

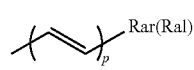 (1)

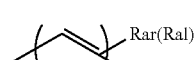 (2)

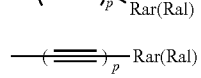 (3)

wherein p is an integer from 0 to 20, wherein Rar is a H or monocyclic or oligocyclic aryl from C6 to C22, wherein -Ral is a H or —R1 or —O—R1 or —N(R1)$_2$ or —NHR1 or

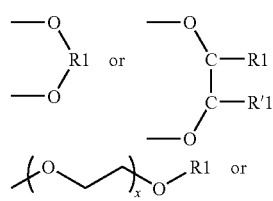

-continued

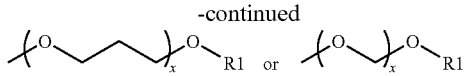

wherein R1, R'1 are same or different from —CH$_2$PO$_3$H$_2$, —CH$_2$CO$_2$H, —CH$_2$SO$_3$H, —CH$_2$CONHOH, —CH$_2$PO$_4$H$_2$, —CH$_2$SO$_4$H$_2$, x≧0, and 0<n<20.

wherein the other one(s) of substituent(s) —R, —R$_1$, —R$_2$ is (are) the same or a different substituent of formula (1), (2) or (3), or is (are) selected from —H, —OH, —R$_3$, —OR$_3$, COOH, COCF3, CN, Br, Cl, F, I, CF3, or —N(R$_3$)$_2$, wherein R$_3$ is a linear or branched alkyl of 1 to 20 carbon atoms.

(XVII)

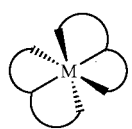

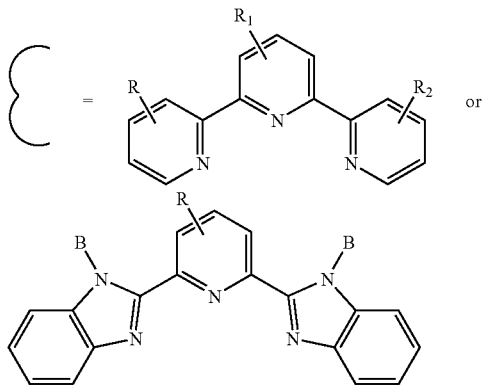

Wherein M=Fe or Ru or Os

B=alkyl (C$_1$ to C$_{20}$) or H

R, R$_1$, R$_2$ may be same or different from COOR$_3$ or PO$_3$R$_3$ or SO$_3$R$_3$ or CONR$_3$OR$_3$ or SO$_4$R$_3$ or COR$_3$ or CF$_3$ or COCF$_3$ or OR$_3$ or NO$_2$ or F or Cl or Br or I or NR$_3$ or alkyl (C$_1$ to C$_{20}$) or H where R$_3$ is an alkyl (C$_1$ to C$_{20}$) or H R, R$_1$, R$_2$ is same or different from COOR$_3$ or PO$_3$R$_3$ or SO$_3$R$_3$ or CONR$_3$OR$_3$ or SO$_4$R$_3$ or COR$_3$ or CF$_3$ or COCF$_3$ or OR$_3$ or NO$_2$ or F or Cl or Br or I or NR$_3$ or a linear or branched alkyl (C$_1$ to C$_{20}$) or H (where R$_3$ is a linear or branched alkyl (C$_1$ to C$_{20}$) or H) or comprises an additional π system located in conjugated relationship with the primary π system, the said substituent is of the type —R=—[π]$_q$—(Ral) or -(Ral)

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —R$_1$, —R$_2$ is of formula (1), (2) or (3)

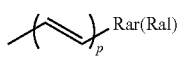 (1)

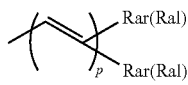 (2)

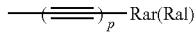 (3)

wherein p is an integer from 0 to 20, wherein Rar is a H or monocyclic or oligocyclic aryl from C6 to C22, wherein -Ral is a H or —R1 or —O—R1 or —N(R1)$_2$ or —NHR1 or

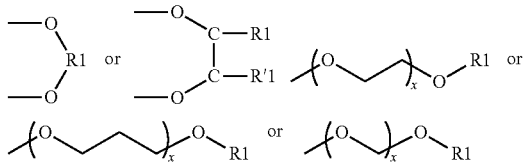

wherein R1, R'1 are same or different from —CH$_2$PO$_3$H$_2$, —CH$_2$CO$_2$H, —CH$_2$SO$_3$H, —CH$_2$CONHOH, —CH$_2$PO$_4$H$_2$, —CH$_2$SO$_4$H$_2$, x≧0, and 0<n<20.

wherein the other one(s) of substituent(s) —R, —R$_1$, —R$_2$ is (are) the same or a different substituent of formula (1), (2) or (3), or is (are) selected from —H, —OH, —R$_3$, —OR$_3$, COOH, COCF$_3$, CN, Br, Cl, F, I, CF3, or —N(R$_3$)$_2$, wherein R$_3$ is a linear or branched alkyl of 1 to 20 carbon atoms.

(XVIII)

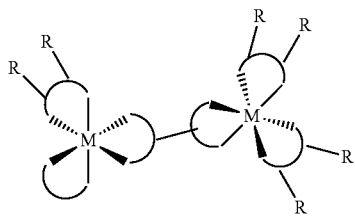

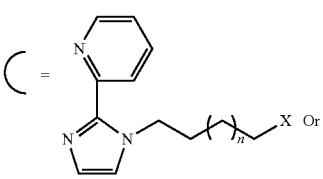

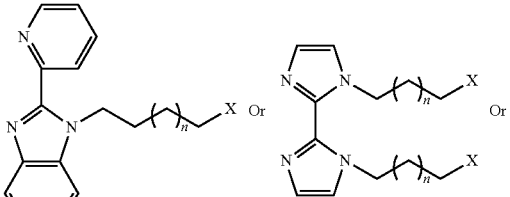

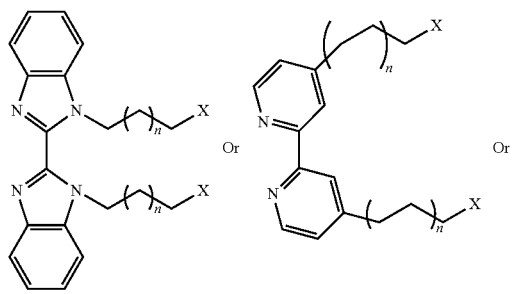

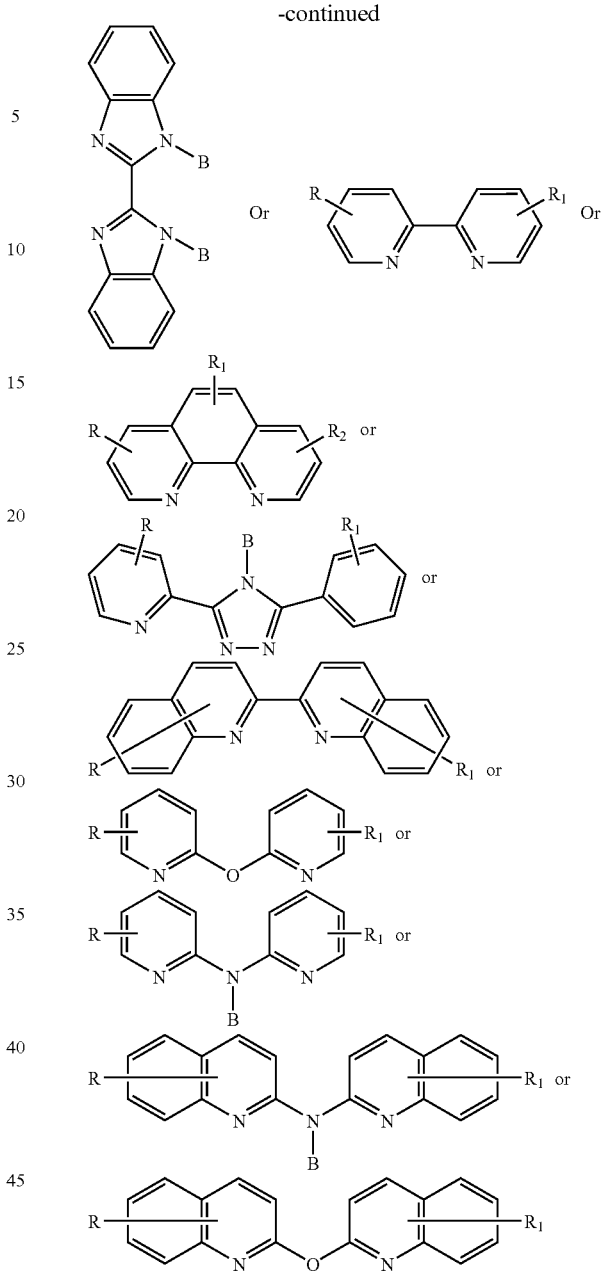

M=Fe or Ru or Os
n=0 to 20
X=PO$_3$H$_2$ or CO$_2$H or SO$_3$H or CONHOH or PO$_4$H$_2$ or SO$_4$H$_2$
P=F or Cl or Br or I or NO$_2$ or CN or NCSe or NCS or NCO

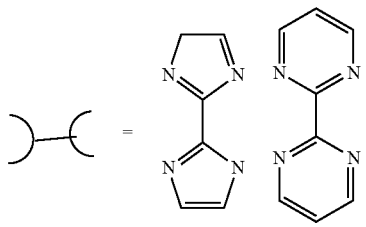

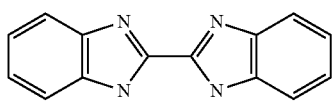

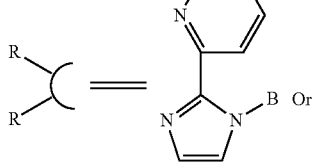

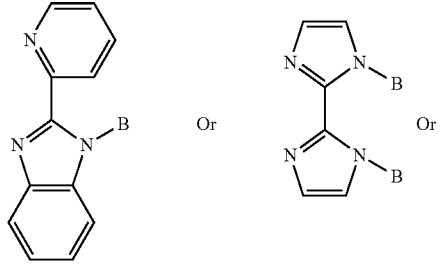

Wherein B=alkyl (C$_1$ to C$_{20}$) or H
R, R$_1$, R$_2$ may be same or different from COOR$_3$ or PO$_3$R$_3$ or SO$_3$R$_3$ or CONR$_3$OR$_3$ or SO$_4$R$_3$ or COR$_3$ or CF$_3$ or COCF$_3$ or OR$_3$ or NO$_2$ or F or Cl or Br or I or NR$_3$ or alkyl (C$_1$ to C$_{20}$) or H where R$_3$ is an alkyl (C$_1$ to C$_{20}$) or H R, R$_1$, R$_2$ is same or different from COOR$_3$ or PO$_3$R$_3$ or SO$_3$R$_3$ or CONR$_3$OR$_3$ or SO$_4$R$_3$ or COR$_3$ or CF$_3$ or COCF$_3$ or OR$_3$ or NO$_2$ or F or Cl or Br or I or NR$_3$ or a linear or branched alkyl (C$_1$ to C$_{20}$) or H (where R$_3$ is a linear or branched alkyl (C$_1$ to C$_{20}$) or H) or comprises an additional π system located in conjugated relationship with the primary π system, the said substituent is of the type —R=-[π]-(Ral) or -(Ral)

wherein -[π]- represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

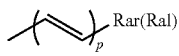 (1)

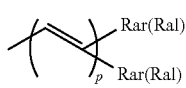 (2)

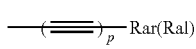 (3)

wherein p is an integer from 0 to 20, wherein Rar is a H or monocyclic or oligocyclic aryl from C6 to C22, wherein -Ral is a H or —R1 or —O—R1 or —N(R1)$_2$ or —NHR1 or

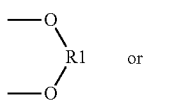 or 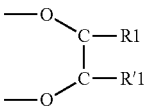

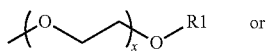

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20.

wherein the other one(s) of substituent(s) —R, —$R_1$, —$R_2$ is (are) the same or a different substituent of formula (1), (2) or (3), or is (are) selected from —H, —OH, —$R_3$, —$OR_3$, COOH, $COCF_3$, CN, Br, Cl, F, I, $CF_3$, or —N($R_3$)$_2$, wherein $R_3$ is a linear or branched alkyl of 1 to 20 carbon atoms.

(XIX)

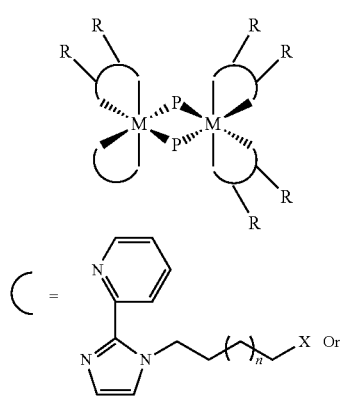

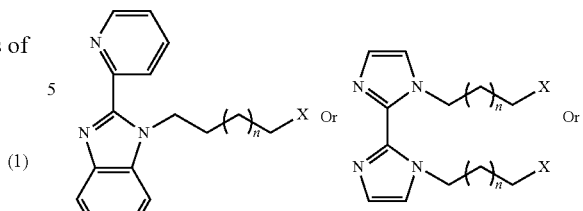

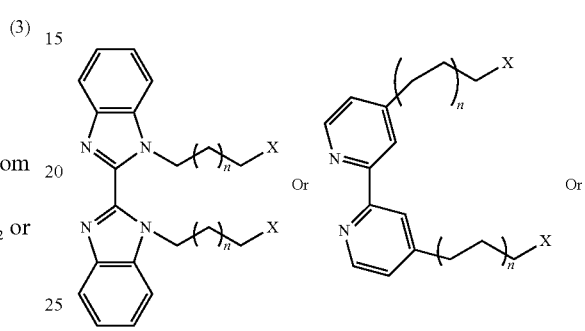

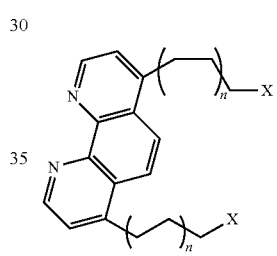

M=Fe or Ru or Os n=0 to 20

X=$PO_3H_2$ or $CO_2H$ or $SO_3H$ or CONHOH or $PO_4H_2$ or $SO_4H_2$

P=CN or NCSe or NCS or NCO

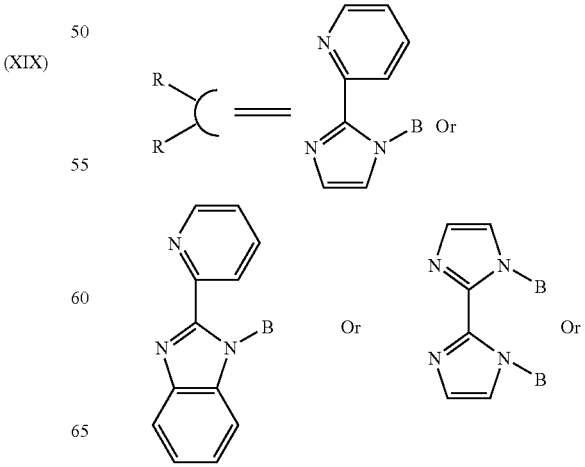

-continued

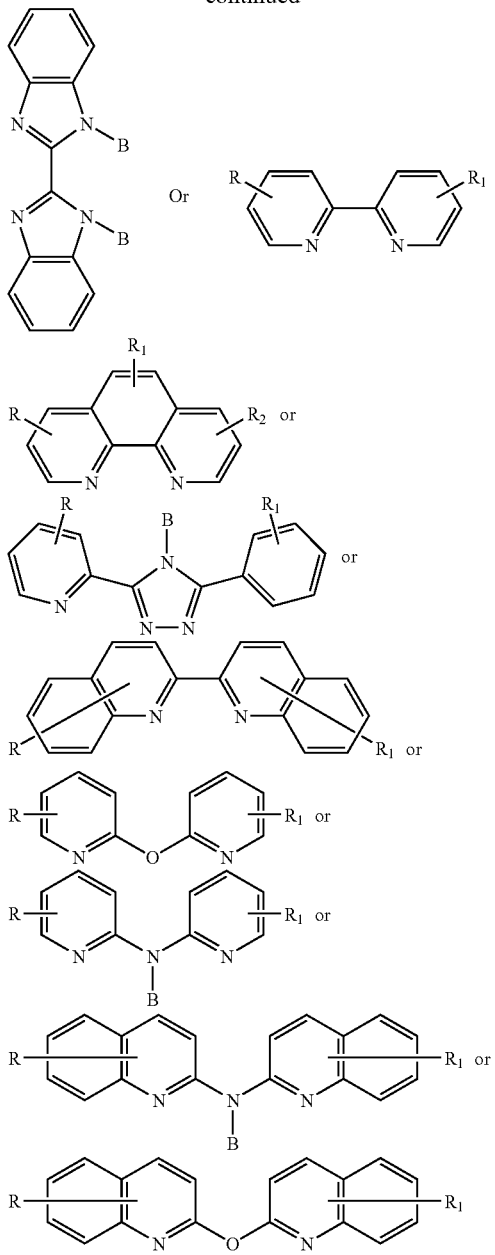

Wherein B=alkyl ($C_1$ to $C_{20}$) or H
R, $R_1$, $R_2$ may be same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H R, $R_1$, $R_2$ is same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is a linear or branched alkyl ($C_1$ to $C_{20}$) or H) or comprises an additional π system located in conjugated relationship with the primary π system, the said substituent is of the type

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

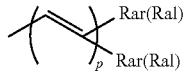

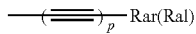

(3)

wherein p is an integer from 0 to 20, wherein Rar is a H or monocyclic or oligocyclic aryl from C6 to C22, wherein -Ral is H or —R1 or —O—R1 or —N(R1)$_2$ or —NHR1 or

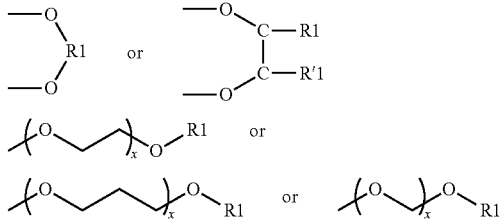

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20.

wherein the other one(s) of substituent(s) —R, —$R_1$, —$R_2$ is (are) the same or a different substituent of formula (1), (2) or (3), or is (are) selected from —H, —OH, —$R_3$, —$OR_3$, COOH, $COCF_3$, CN, Br, Cl, F, I, $CF_3$, or —N($R_3$)$_2$, wherein $R_3$ is a linear or branched alkyl of 1 to 20 carbon atoms.

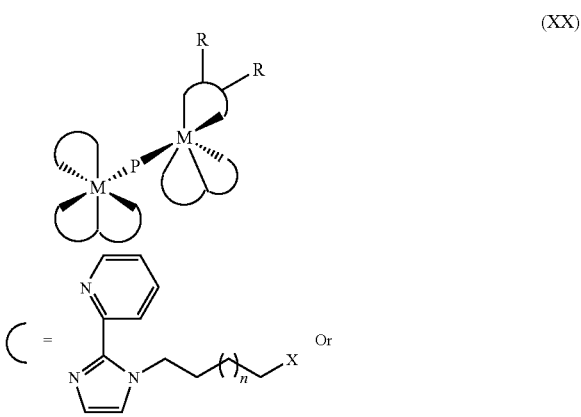

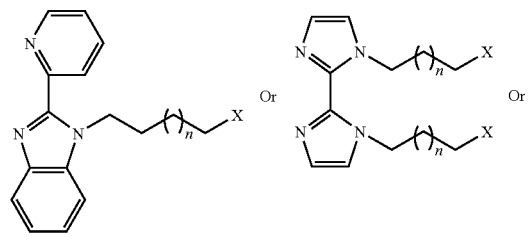

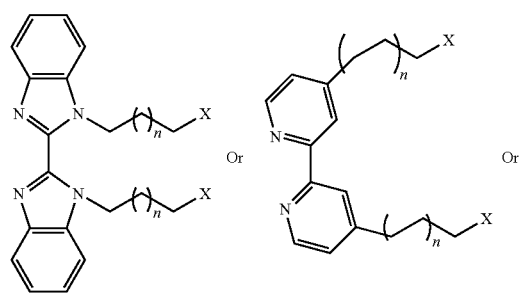

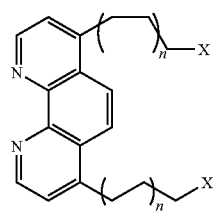

M=Fe or Ru or Os
n=0 to 20
X=PO$_3$H$_2$ or CO$_2$H or SO$_3$H or CONHOH or PO$_4$H$_2$ or SO$_4$H$_2$
P=CN or NCSe or NCS or NCO or pyrazine.

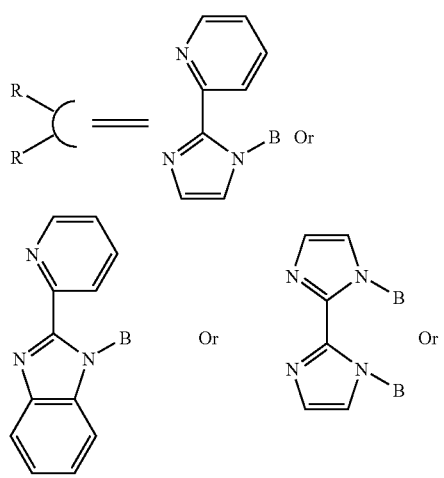

Wherein B=alkyl (C$_1$ to C$_{20}$) or H
R, R$_1$, R$_2$ may be same or different from COOR$_3$ or PO$_3$R$_3$ or SO$_3$R$_3$ or CONR$_3$OR$_3$ or SO$_4$R$_3$ or COR$_3$ or CF$_3$ or COCF$_3$ or OR$_3$ or NO$_2$ or F or Cl or Br or I or NR$_3$ or alkyl (C$_1$ to C$_{20}$) or H where R$_3$ is an alkyl (C$_1$ to C$_{20}$) or H R, R$_1$, R$_2$ is same or different from COOR$_3$ or PO$_3$R$_3$ or SO$_3$R$_3$ or CONR$_3$OR$_3$ or SO$_4$R$_3$ or COR$_3$ or CF$_3$ or COCF$_3$ or OR$_3$ or NO$_2$ or F or Cl or Br or I or NR$_3$ or a linear or branched alkyl (C$_1$ to C$_{20}$) or H (where R$_3$ is a linear or branched alkyl (C$_1$ to C$_{20}$) or H) or comprises an additional π system located in conjugated relationship with the primary π system, the said substituent is of the type —R=[π]—(Ral) or -(Ral)

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

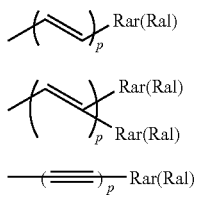

wherein p is an integer from 0 to 20,
wherein Rar is a H or monocyclic or oligocyclic aryl from C6 to C22,
wherein -Ral is a H —R1 or —O—R1 or —N(R1)$_2$ or —NHR1 or

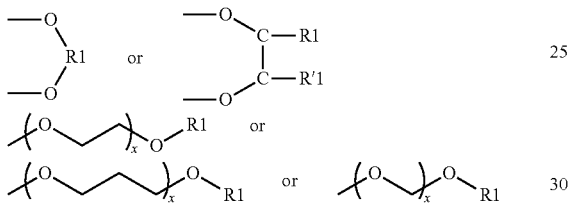

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20.
wherein the other one(s) of substituent(s) —R, —$R_1$, —$R_2$ is (are) the same or a different substituent of formula (1), (2) or (3), or is (are) selected from —H, —OH, —$R_3$, —$OR_3$, COOH, COCF3, CN, Br, Cl, F, I, CF3, or —N($R_3$)$_2$, wherein $R_3$ is a linear or branched alkyl of 1 to 20 carbon atoms.

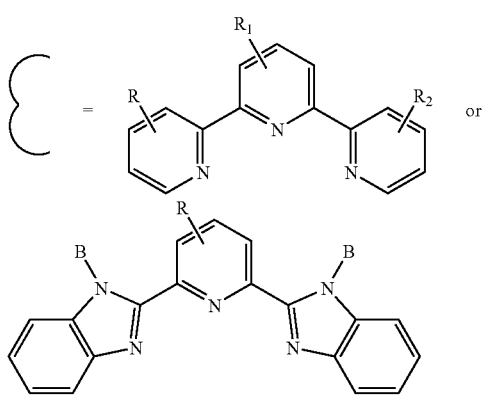

Wherein B=alkyl ($C_1$ to $C_{20}$) or H
R, $R_1$, $R_2$ may be same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H R, $R_1$, $R_2$ is same or different from $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is a linear or branched alkyl ($C_1$ to $C_{20}$) or H) or comprises an additional π system located in conjugated relationship with the primary π system, the said substituent is of the type —R=—[π]—(Ral) or -(Ral)

wherein —[π]— represents schematically the π system of the aforesaid substituent, Ral represents an aliphatic substituent with a saturated chain portion bound to the π system, and wherein q represents an integer, indicating that —[π]— may bear more than one substituent Ral.

wherein at least one of substituents —R, —$R_1$, —$R_2$ is of formula (1), (2) or (3)

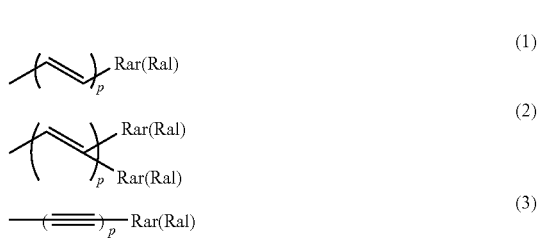

wherein p is an integer from 0 to 20,
wherein Rar is a H or monocyclic or oligocyclic aryl from C6 to C22,
wherein -Ral is —R1 or —O—R1 or —N(R1)$_2$ or —NHR1 or

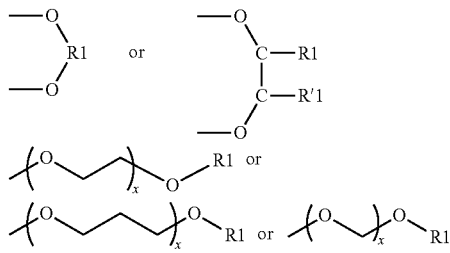

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<10.
wherein the other one(s) of substituent(s) —R, —$R_1$, —$R_2$ is (are) the same or a different substituent of formula (1), (2) or (3), or is (are) selected from —H, —OH, —$R_3$, —$OR_3$, COOH, COCF3, CN, Br, Cl, F, I, CF3, or —N($R_3$)$_2$, wherein $R_3$ is a linear or branched alkyl of 1 to 20 carbon atoms.

EXAMPLE 1

Methods $LiFePO_4$ was synthesized by a variant of solid state reaction[15] employing $FeC_2O_4 \cdot 2H_2O$ and $LiH_2PO_4$ as precursors. Their stoichiometric amounts were mixed and ground in a planetary ball-milling machine for 4 h. Then the powder was calcined in a tube furnace with flowing Ar—$H_2$ (92:8 v/v) at 600° C. for 24 h. After cooling down to room temperature, the sample was ground in agate mortar. The BET surface area of the powder was ca. 5 m$^2$/g with an average particle size of 400 nm. X-ray diffraction confirmed the phase purity. The Ru-bipyridine complex, NaRu(4-carboxylic acid-4'-carboxylate (4,4'-dionyl-2,2'bipyridine)(NCS)$_2$, coded as Z-907Na was synthesized as described elsewhere[16]. Single walled carbon nanotubes were grown by catalytic laser ablation method. The average diameter of tubes was determined by Raman and Vis-NIR spectroscopy to be ca. 1.3-1.4 nm. Other chemicals were from commercial sources and were used as received.

SWCNT were dispersed with solutions of surfactants (either pyrene butanoic acid in dimethylformamide (DMF) or Z-907Na in acetonitrile+tert-butanol (1:1) (AN/t-BuOH) by sonication. The optimized synthetic protocol for Z-907Na was as follows: 9 mg of SWCNT was sonicated for 2 hours with 10 mL of $6 \cdot 10^{-4}$ M Z-907Na in acetonitrile+t-butanol (1:1). The resulting black-brown solution was centrifuged at 5000 rpm for 1 hour, while ca. 4 mg of undissolved carbon remained as a sediment. This working solution (abbreviated further as Z-907Na/SWCNT) was stable for at least weeks at room temperature without precipitation. Hence, the solution contained ca. 5 mg of dispersed SWCNT (417 μmol) and 6 μmol of Z-907Na (molar ratio C/Z-907Na≈70). The olivine LiFePO$_4$ (200 mg) was mixed with several portions (0.5-0.7 mL) of this working solution. At the initial stages, the supernatant turned to colorless within several seconds after mixing. After each addition of the Z-907Na/SWCNT solution, the slurry was centrifuged, supernatant separated and a next portion of the solution was added. This procedure was repeated until the supernatant did not decolorize. The total amount of applied solution was 1.5 mL. Finally the powder was washed with AN/t-BuOH and dried at room temperature. The same synthetic protocol was also adopted also for surface derivatization of LiFePO$_4$ with pyrenebutanoic acid/SWCNT.

Electrodes were prepared by mixing the powder of surface derivatized LiFePO$_4$ with 5 wt % of polyvinylidene fluoride (PVDF) dissolved in N-methyl-2-pyrolidone. The resulting homogeneous slurry was then doctor-bladed onto F-doped conducting glass (FTO) and dried at 100° C. overnight. Alternatively the slurry was coated on alumina current collector and dried at 100° C. overnight. The typical film mass was 1.5-2 mg/cm$^2$. Blank electrodes from pure LiFePO$_4$ were prepared in the same way for reference experiments. A second reference material was a carbon-coated LiFePO$_4$ (Nanomyte BE-20 from NEI Corporation, USA). The electrode was assembled in the electrochemical cell with Li reference and counter electrodes or alternatively in the Swagelok cell with Li negative electrode.

Methods

Vis-NIR spectra were measured at Varian Cary 5 spectrometer in 2 mm glass optical cells. The measurement was carried out in transmission mode with integrating sphere. Electrochemical experiments employed an Autolab PGSTAT 30 potentiostat. The electrolyte was 1 M LiPF$_6$ in ethylene carbonate (EC)/dimethyl carbonate (DMC) (1:1, v:v). The reference and counter electrodes were from Li-metal.

Results and Discussion

FIG. 1 shows the Vis-NIR spectra of $6\times10^{-4}$ M solution of Z-907Na complex and the working solution Z-907Na/SWCNT. In the latter case, we detected the characteristic features of carbon nanotubes. Semiconducting SWCNT are characterized by optical transitions between van Hove singularities at ca. 0.7 eV and 1.3 eV for the first and second pair of singularities, respectively. Metallic tubes manifest themselves by a transition at 1.8-1.9 eV, which corresponds to the first pair of Van Hove singularities. The main peak of Z-907Na occurs at ca. 2.35 eV, and it is blue shifted by ca. 50 meV in the SWCNT-containing solution (FIG. 1). Obviously, the Z-907Na complex acts as an efficient surfactant for SWCNT, due to the presence of hydrophobic aliphatic C9 chains (Scheme 1), which interact with the carbon tube surface. There are many other molecules reported for solubilization of SWCNT, the most popular being sodium dodecyl sulfate[17], but, to the best of our knowledge, the solubilization of SWCNT by Ru-bipyridine complexes is here demonstrated for the first time.

Scheme 7: The molecular structure of Z-907Na, redox active

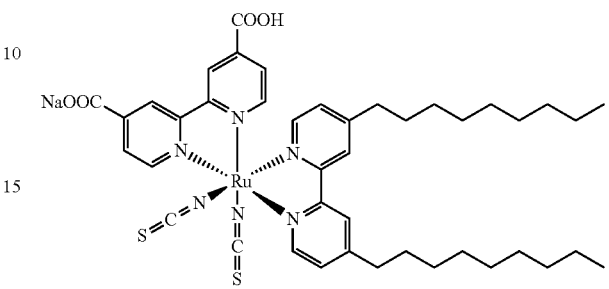

Figure 2:
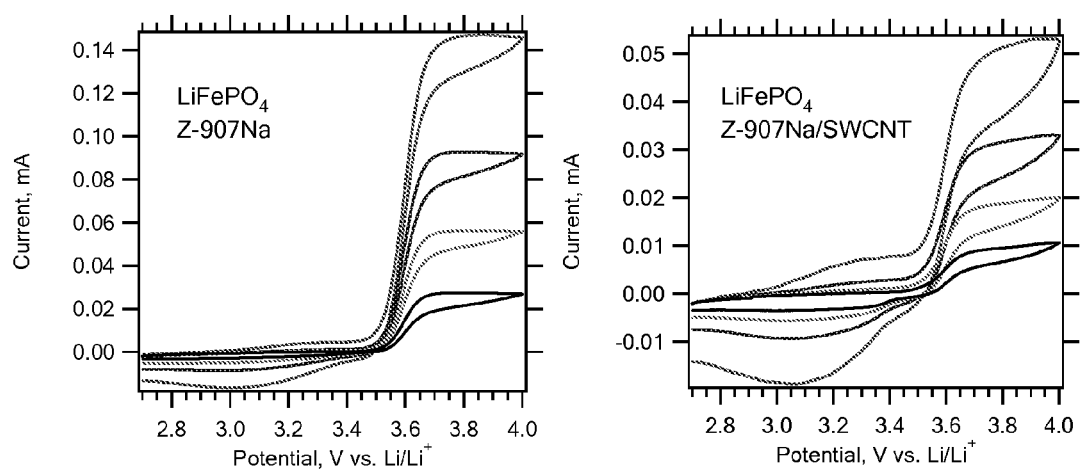

FIG. 2 (left chart) shows the cyclic voltammogram of a pure (carbon free) LiFePO$_4$ (bonded with 5% PVDF), which was treated by dip-coating into $6\times10^{-4}$ mol/L solution of Z-907Na for 3 hours, rinsed with AN/t-BuOH and dried in vacuum at room temperature. The right chart plots analogous data for pure LiFePO$_4$ electrode, which was treated with Z-907Na/SWCNT solution in the same way. We see a plateau anodic current, which indicates the so-called "molecular wiring" of LiFePO$_4$[18]. The Z-907Na complex (as in Scheme 1, can transport electronic charge via surface percolation in adsorbed monolayer even on insulating surfaces like Al$_2$O$_3$[19]. Here, the NCS groups act as mediators for the surface-confined hole percolation, and the bipyridine ligands transport electrons. The hole diffusion coefficient within adsorbed Z-907Na was of the order of $10^{-9}$ cm$^2$/s above the charge percolation threshold, ca. 50% of surface coverage[19].

The effect of molecular wiring was recently applied to the LiFePO$_4$ electrode material, which can be wired by 4-(bis(4-methoxyphenyl)amino)benzylphosphonic acid[20]. In this case, the cross-surface hole percolation was followed by interfacial charging and discharging of LiFePO$_4$ with Li$^+$ ions[20]. Our data confirm that the hole-transport wiring is possible also with the Z-907Na complex, while a similar anodic current (exceeding 0.2 mA/cm$^2$) can be wired to the LiFePO$_4$ electrode at 0.1 V/s. The formal redox potential of Z-907Na adsorbed on inert TiO$_2$ surface was about 3.5 V vs. Li/Li$^+$[19,21], which is just sufficient for the anodic wiring of LiFePO$_4$ (redox potential 3.45 V vs. Li/Li$^+$) but not for cathodic wiring[20]. Our data on FIG. 2 also confirm that the COOH/COONa are suitable anchoring groups for LiFePO$_4$, similar to the phosphonic acid anchoring group employed previously[20]. The total anodic charge was between 2 to 4 mC (0.4 to 0.7 mAh/g) for the electrode in FIG. 2 (left chart) at the given scan rates. This charge was not much larger at slower scanning and moreover, the electrode was unstable during repeated cycling at slower scan rates. The molecular wiring via adsorbed Z-907Na is sensitive to imperfections in the surface layer, which hamper the hole percolation.

FIG. 2 (right chart) shows a variant of the previous experiment, where the LiFePO$_4$ film was treated by dip-coating into Z-907Na/SWCNT solution. Surprisingly, the anodic current is now considerably smaller, which may be due to poor accessibility of the pores in the pre-deposited LiFePO$_4$ layer for SWCNT. As the carbon tubes are typically 1-10 μm long, they cannot easily interpenetrate the compact porous solid. Hence, the Z-907Na/SWCNT assemblies reside prevailingly on top of the LiFePO$_4$ layer. We may assume that either some free complex (Z-907Na) may still be present in our working solution Z-907Na/SWCNT or may be partly released from the SWCNT upon interaction with the LiFePO$_4$ surface. This causes poor surface coverage and attenuated molecular wiring in this case.

Figure 3:
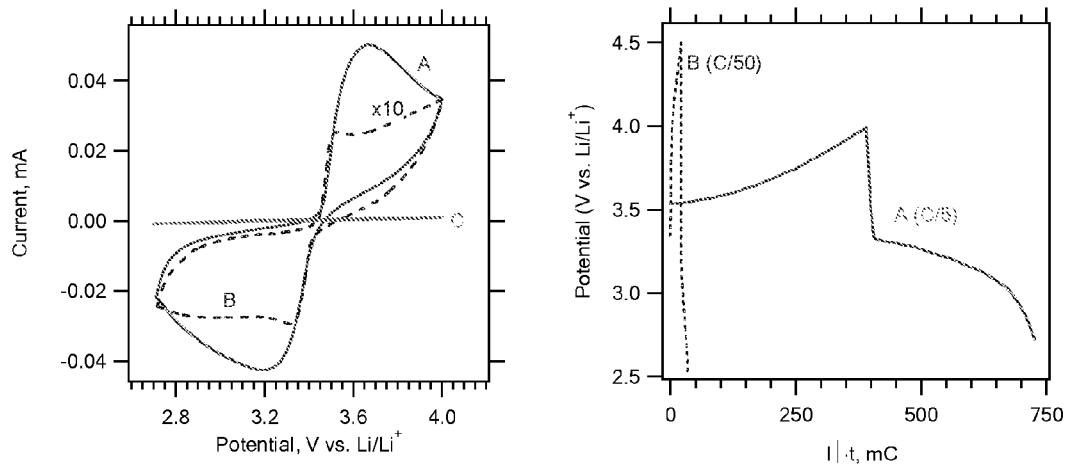

However, this situation changes dramatically, if the surface derivatization is carried out with the starting LiFePO$_4$ powder instead of the doctor-bladed porous film. FIG. 3 (left chart) shows cyclic voltammogram of this electrode compared to the voltammograms of an electrode, which was fabricated in the same way, but instead of using Z-907Na complex as a surfactant, the SWCNT were solubilized by pyrene butanoic acid. Obviously, this electrode shows practically no activity, indicating that the sole carbon nanotubes do not promote the charging/discharging of LiFePO$_4$. Also the electrode from carbon-coated LiFePO$_4$ (Nanomyte BE-20, NEI) shows much smaller activity compared to our Z-907Na/SWCNT electrode at the same conditions. A comparative experiment with Z-907Na/SWCNT treated LiMnPO$_4$ powder also showed practically no electrochemical activity (data not shown). The charging/discharging of LiFePO$_4$ via the surface attached Z-907Na/SWCNT assemblies was reasonably reversible, providing at 0.1 mV/s scan rate the specific capacity of ca. 41 mAh/h for anodic process and 40 mAh/g for cathodic process (see data on FIG. 3). The electrode was also quite stable, showing no obvious capacity fading in repeated voltammetric scans.

The exceptional properties of our Z-907Na/SWCNT electrode are further demonstrated by galvanostatic charging/discharging cycle. FIG. 3 (right chart) demonstrates that the Z-907Na/SWCNT electrode delivered at the charge rate C/5 and cut-off potentials 4 and 2.7 V vs. Li/Li$^+$ the anodic charge of 390 mC (51 mAh/g) and the cathodic charge of 337 mC (44 mAh/g). A comparative test with carbon-coated LiFePO$_4$ (Nanomyte BE-20, NEI) cannot be carried out due to negligible activity of this electrode at the C/5 rate. Even at ten times slower charging, this carbon-coated electrode exhibits much worse performance (curve B in FIG. 3, right chart).

The applied amount of working solution Z-907Na/SWCNT (1.5 mL; 6×10$^{-4}$ mol/L Z-907Na) gives the upper limit of the adsorbed Z-907Na to be 0.9 μmol and the amount of adsorbed carbon (in the form of SWCNT) to be 6.3 μmol per 200 mg of LiFePO$_4$ (See Experimental Section). The concentration of elemental carbon from SWCNT was, therefore, less than 0.04 wt % in the final solid material). From the BET surface area of LiFePO$_4$ we can calculate that the surface coverage of Z-907Na is equivalent to about one molecule per 2 nm$^2$. This is not far from the monolayer coverage, if we take into account the usual dimensions of Ru-bipyridine molecules[22].

The unprecedented activity of the electrode composite of LiFePO$_4$/Z-907Na/SWCNT is obviously due to the presence of carbon nanotubes, which can quickly transport the charge mediated by Z-907Na complex towards the olivine surface. This beneficial role of carbon nanotubes even promotes the cathodic process. This is almost absent in sole molecular wiring, due to low driving force of the redox process in Z-907Na for the reduction of Li$_{1-x}$FePO$_4$ back to the starting stoichiometric composition (FIG. 2).

EXAMPLE 2

Synthesis of 12-(2,5-di-tert-butyl-4-methoxyphenoxy) dodecyl phosphonic acid

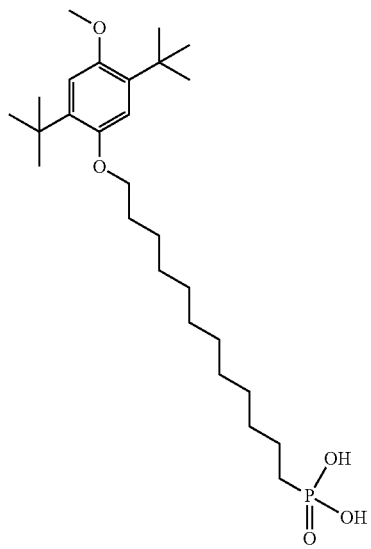

Scheme 1

C$_{27}$H$_{49}$O$_5$P
Mol. Wt.: 484.65
m/e: 484.33 (100.0%), 485.34 (30.0%), 486.34 (5.4%)

Ratio of Reactants:

| Reagent | F.W (uma) | g | ml | mol |
| --- | --- | --- | --- | --- |
| I | 540.76 | 0.5 | | 0.925 · 10$^{-3}$ |
| HCl$_{37\%}$ | 35.5 | | 5 | |

Method: In a 25 ml three necked round bottomed flask (equipped with a condenser) were placed 0.5 g of I dissolved in a 12N HCl water solution (5 ml). The solution was stirred at reflux temperature for about one night. The reactor was kept in the dark. The reaction was followed by 1H-NMR until the signal of CH$_2$ of the esters has disappeared. Then the excess of chlorhydric acid was distilled off at reduced pressure, and the product collected as brown viscous oil. The product was dissolved two to three times in toluene and the solvent distilled off at reduced pressure. No other purification was needed. Yield: quatitative.

$^1$H-NMR (CDCl$_3$): 1.18-1.35 ppm (bm, 36H, H chain+ C(CH$_3$)$_3$); 1.48 ppm (m, 2H, H chain); 1.81 ppm (m, 4H, H chain); 3.80 ppm (s, 3H, OCH$_3$); 3.94 ppm (t, 2H, OCH$_2$CH$_2$); 6.81 ppm (d, 2H, H$_{ar}$).

Synthetic Route:
Scheme 2
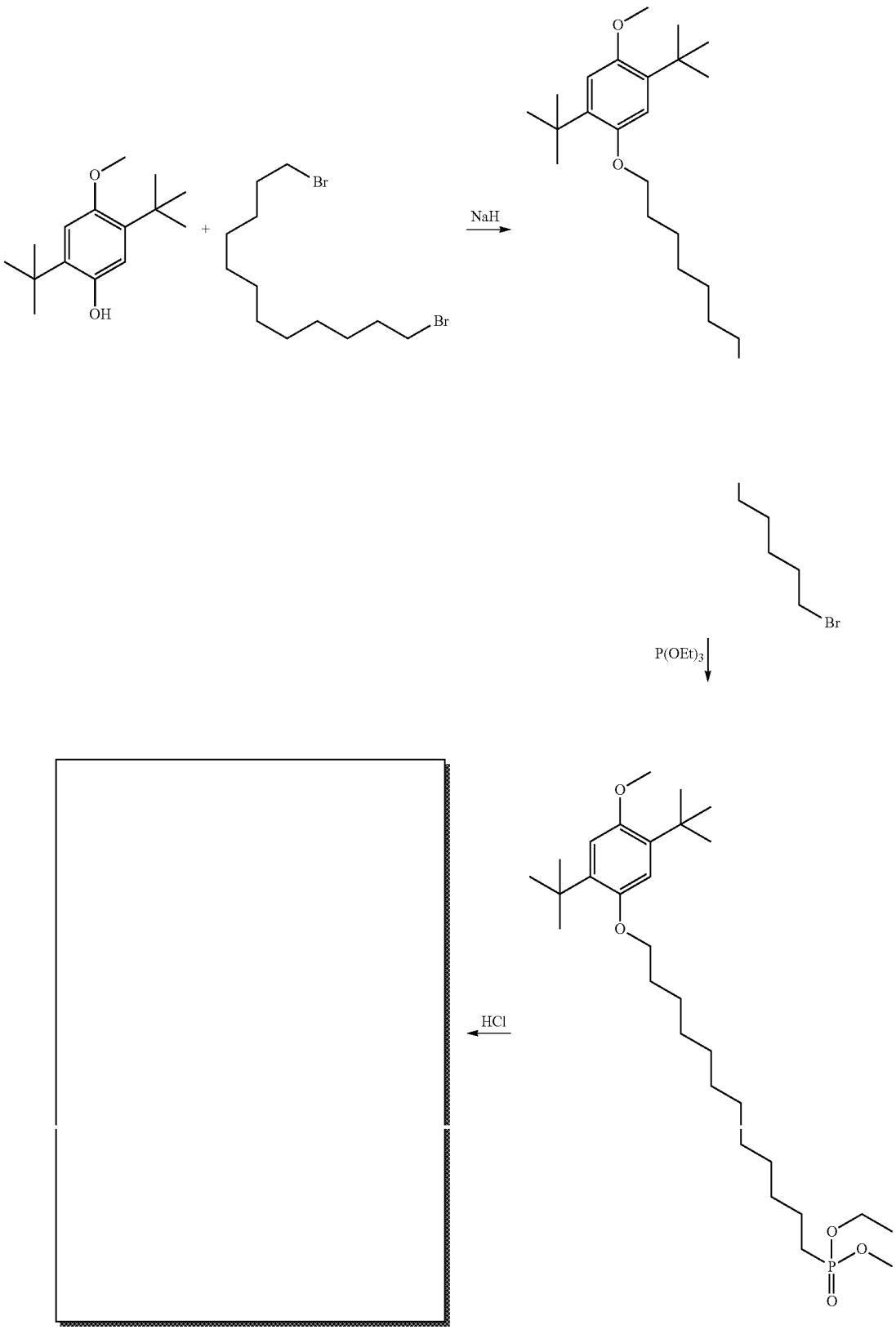

Intermediate 1: 1-(12-bromododecyloxy)-2,5-di-tert-butyl-4-methoxybenzene[i]

Scheme 3

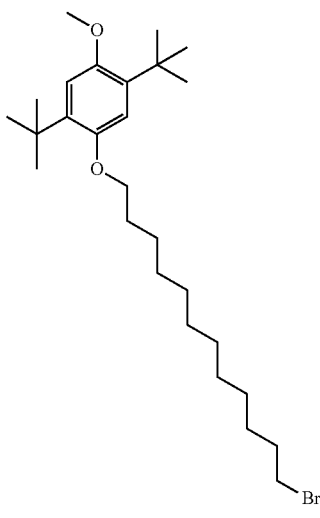

$C_{27}H_{47}BrO_2$
Mol. Wt.: 483.56
m/e: 482.28 (100.0%), 484.27 (97.3%), 483.28 (29.8%), 485.28 (29.1%), 486.28 (4.6%), 484.28 (4.5%)

Scheme 4 synthesis of the intermediate 1

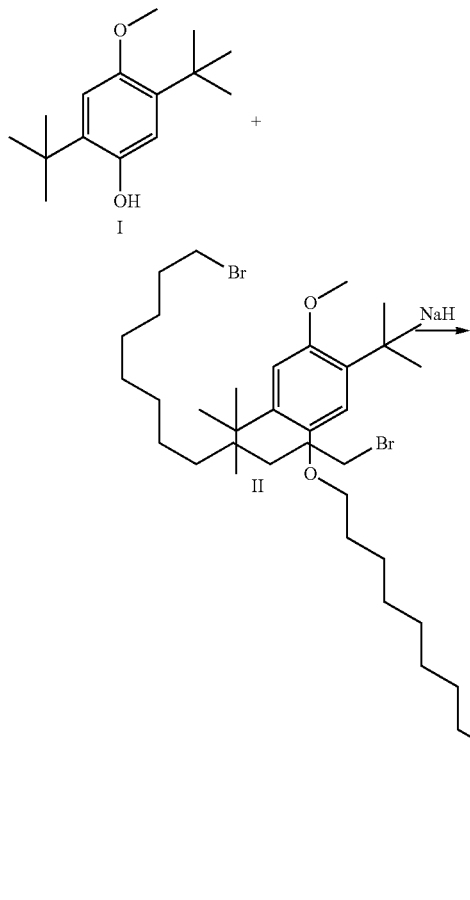

Ratio of Reactants:

| Reagent | F.W (uma) | g | mol |
|---|---|---|---|
| I | 236.35 | 1 | $4.23 \cdot 10^{-3}$ |
| II | 328 | 3.5 | $1.06 \cdot 10^{-2}$ |
| NaH | 24 | 0.11 | $4.6 \cdot 10^{-3}$ |

Method: In a 100 ml three necked round bottomed flask (equipped with a Schlenk cock) were placed 0.11 g of NaH in anhydrous THF (15 ml) and 1 gram (4.23 mmol) of I. A gas evolution occurred for a few minutes, when it was finished 3.5 g (10 mmol) of 1,12-dibromododecane (dissolved in 15 ml of THF) were added. The mixture was stirred at room temperature for about one hour, then the system was refluxed for 20 hours. The reactor was kept in the dark and in a inert atmosphere (argon). Then the mixture was cooled to room temperature and 60 ml of water were added. The organic phase was extracted with DCM (3×60 ml), dried with $CaCl_2$ and the solvent removed under vacuum to give a slightly yellow viscous liquid. The product was purified by flash chromatography on silica gel (ethyl acetate/petroleum ether 5:95), giving 1.7 g of pure (GC/MS) product (colourless liquid). Yield: 83%.

MS (EI): 482 (M+), 484 (M+2), 236; 221 (100%).
$^1$H-NMR (CDCl$_3$, t.a.): 1.28-1.32 ppm (bm, 36H, H chain+C(CH$_3$)$_3$); 1.81 ppm (bm, 4H, H chain); 3.76 ppm (s, 3H, O CH$_3$); 3.90 ppm (t, 2H, OCH$_2$CH$_2$); 4.10 ppm (t, 2H, CH$_2$Br); 6.81 ppm (bs, 2H, H$_{ar}$).

Intermediate 2: diethyl 12-(2,5-di-tert-butyl-4 methoxyphenoxy) dodecylphosphonate Scheme 5: Chemical structure of the intermediate 2

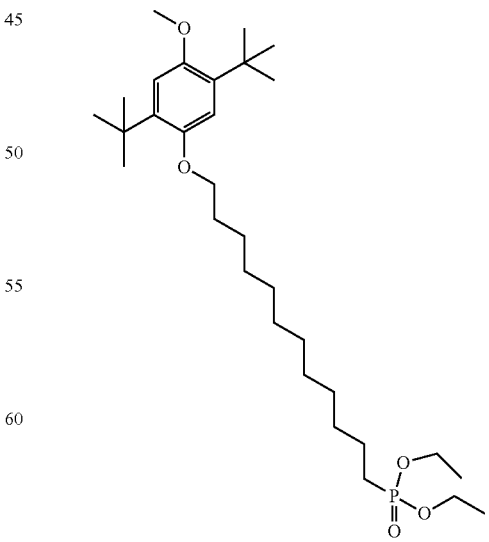

$C_{31}H_{57}O_5P$
Mol. Wt.: 540.76
m/e: 540.39 (100.0%), 541.40 (34.4%), 542.40 (6.8%)

[i] *J. Phys. Chem. B*, 106 (27), (2002), 6860

Scheme 6: synthesis of the intermediate 2

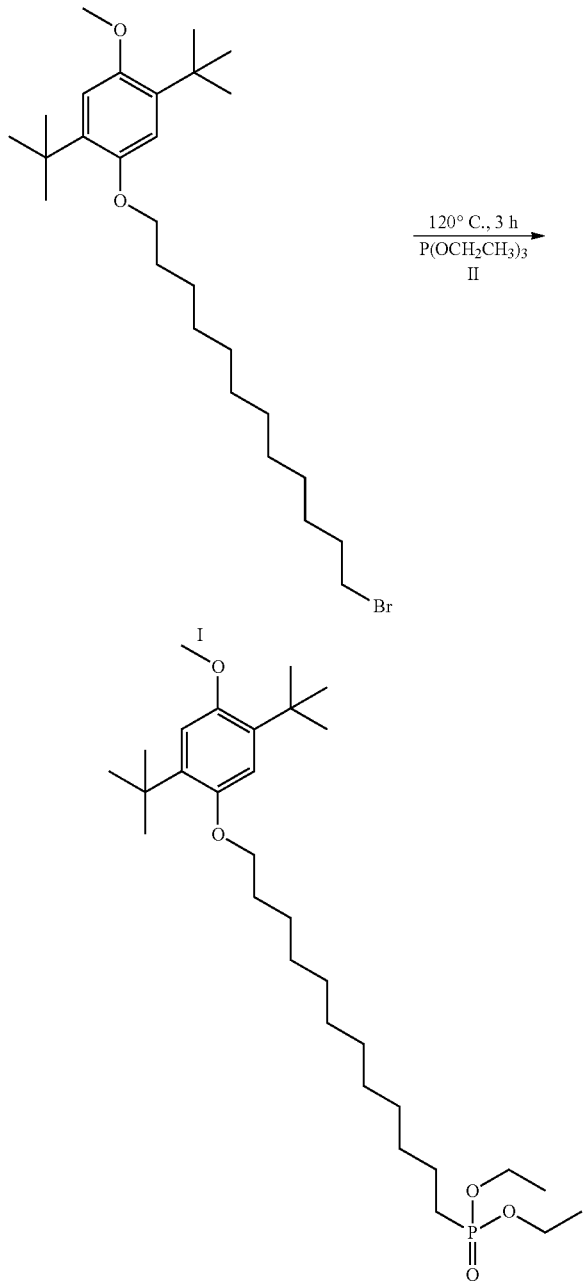

Ratio of Reactants:

| Reagent | F.W (uma) | g | ml | mol |
|---------|-----------|---|-----|------|
| I | 483.56 | 1 | | $2.07 \cdot 10^{-3}$ |
| II | 166.16 | | 8 | |

Method: In a 25 ml three necked round bottomed flask (equipped with a condenser) were placed 1 g of I dissolved in triethylphosphite (8 ml). The solution was stirred at 120° C. for about three hour. The reactor was kept in the dark and in a inert atmosphere (argon). Then the excess of triethylphosphite was distilled off at reduced pressure and the product collected as brown liquid. The purification was carried out by flash chromatography on silica gel (petrol ether/ethyl acetate 5:1). The pure product is a colourless liquid (Yield: 85%).

MS (EI): 540 (M+); 305 (100%). $^1$H-NMR (CDCl$_3$): 1.18-1.35 ppm (bm, 42H, H chain+POCH$_2$CH$_3$+C(CH$_3$)$_3$); 1.71 ppm (m, 2H, H chain); 1.81 ppm (m, 4$\overline{H, H}$ chain); 3.80 ppm (s, 3H, OCH$_3$); 3.94 ppm (t, 2H, OCH$_2$CH$_2$); 4.09 ppm (m, 4H, POC$\overline{H_2}$CH$_3$); 6.81 ppm (d, 2H, $\overline{H_{ar}}$).

Results and Discussion

Figure 4:
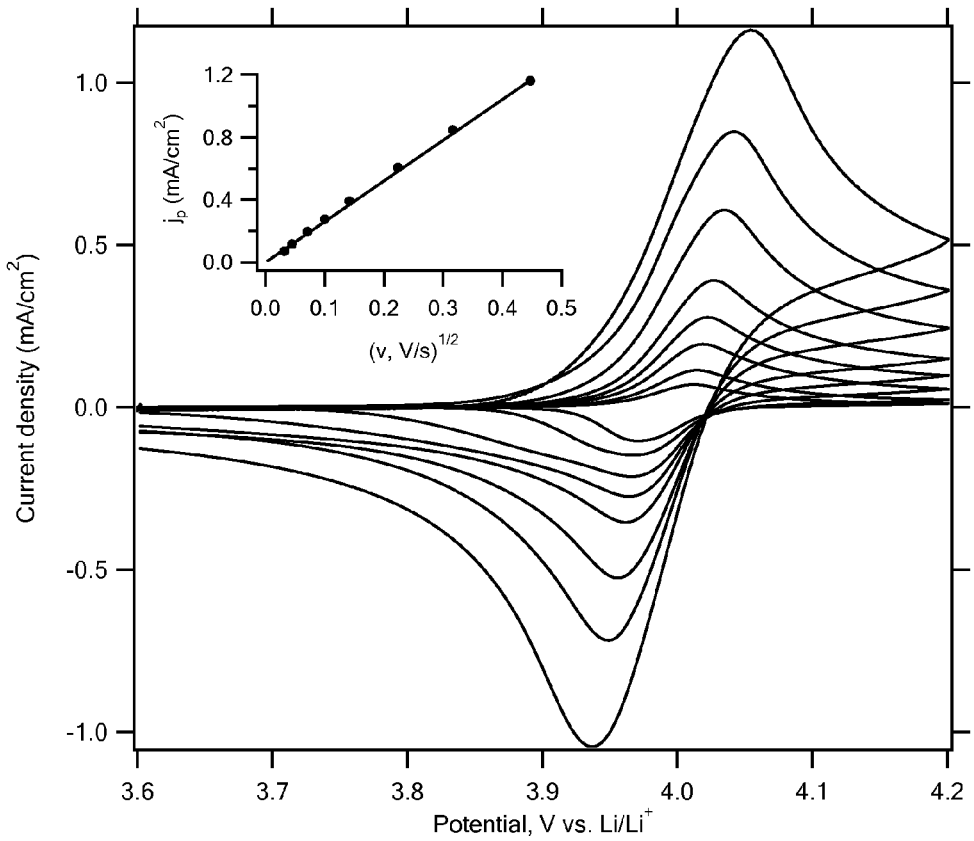

FIG. 4 shows the cyclic voltammogram of DW adsorbed on mesoscopic TiO$_2$ electrode. DW exhibits reversible charge-transfer reaction, despite the TiO$_2$ is insulating in this potential region and inactive for (dark) electrochemistry. This is an evidence for cross-surface electron/hole percolation in the DW molecules. UV-spectrophotometry indicated the surface coverage of TiO$_2$ with DW$^{ref\ 23}$ to be 0.3 nmol/cm$^2$, which translates into ≈2 molecules/nm$^2$. (The surface coverage is refereed to the overall physical surface of the electrode material, which was 55 cm$^2$). The integrated voltammetric charge at the slowest scan (1 mV/s) was 1.51 mC, which translates into 0.28 nmol/cm$^2$. Hence, the DW makes roughly a monolayer on the TiO$_2$ surface, and is fully active for ambipolar charge transport from the FTO support. Inset in FIG. 4 shows that the forward peak current density, $J_p$ scales with the square root of the scan rate, $v^{1/2}$ according to the Randles-Sevcik equation:

$$J_p = 2.69 \cdot 10^5 n^{3/2} D_+^{1/2} c_0 v^{1/2} \quad (1)$$

(n is number of electrons). The concentration of DW in the film (thickness 2.5 μm) equals $c_0 = 3.3 \cdot 10^{-4}$ mol/cm$^3$. From the slope of the line in FIG. 4 (inset) and Eq. (1) we can calculate the diffusion coefficient $D_+ = 9 \cdot 10^{-10}$ cm$^2$/s. This coefficient describes actually the cross surface motion of holes though the DW monolayer, and not the mass transport, because the translational motion of adsorbed molecules is obviously excluded. Therefore, the charge transfer stops, if a percolation threshold is achieved. The found $D_+$ is not too far from the value for Ru-bipyridine complex Z-907 adsorbed on TiO$_2$[$D_+$=(1.5 to 4.1)·10$^{-9}$ cm$^2$/s], but is by three orders of magnitude smaller than the value of "real" diffusion coefficient of DBB dissolved in electrolyte solution (1.6·10$^{-6}$ cm$^2$/s).

Figure 5:
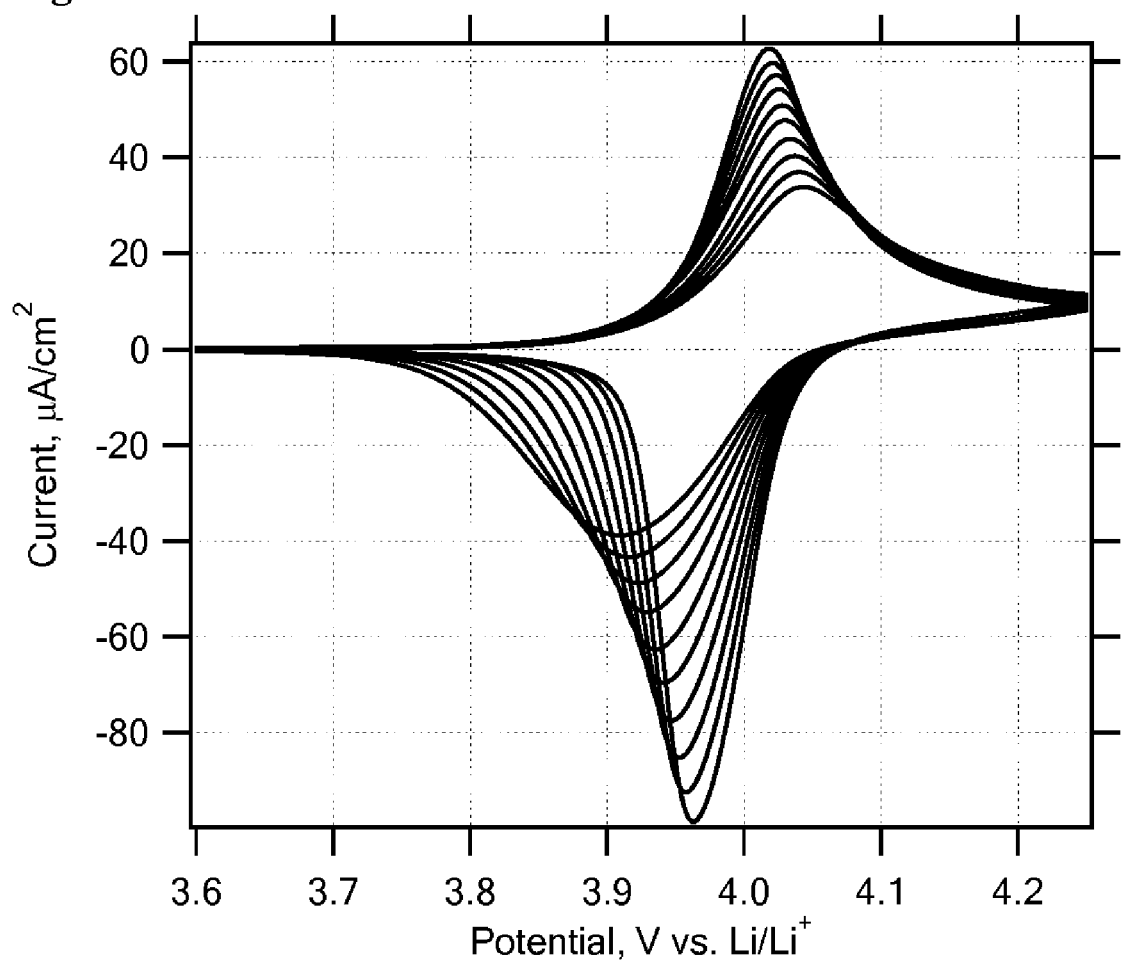

FIG. 5 shows cyclic voltammograms of DW on TiO$_2$. The peak-to-peak splitting for the first scan was between 41 to 59 mV. The splitting is narrower than 60/n mV expected for a reversible redox system in solution, which indicates the surface confinement of DW. During repeated scanning, the integral voltammetric charge drops by ca. 2% per cycle and also the peak-to-peak splitting increases. This illustrates that there are certain limits of the stability of the DW/TiO$_2$ system at these conditions.

Figure 6:
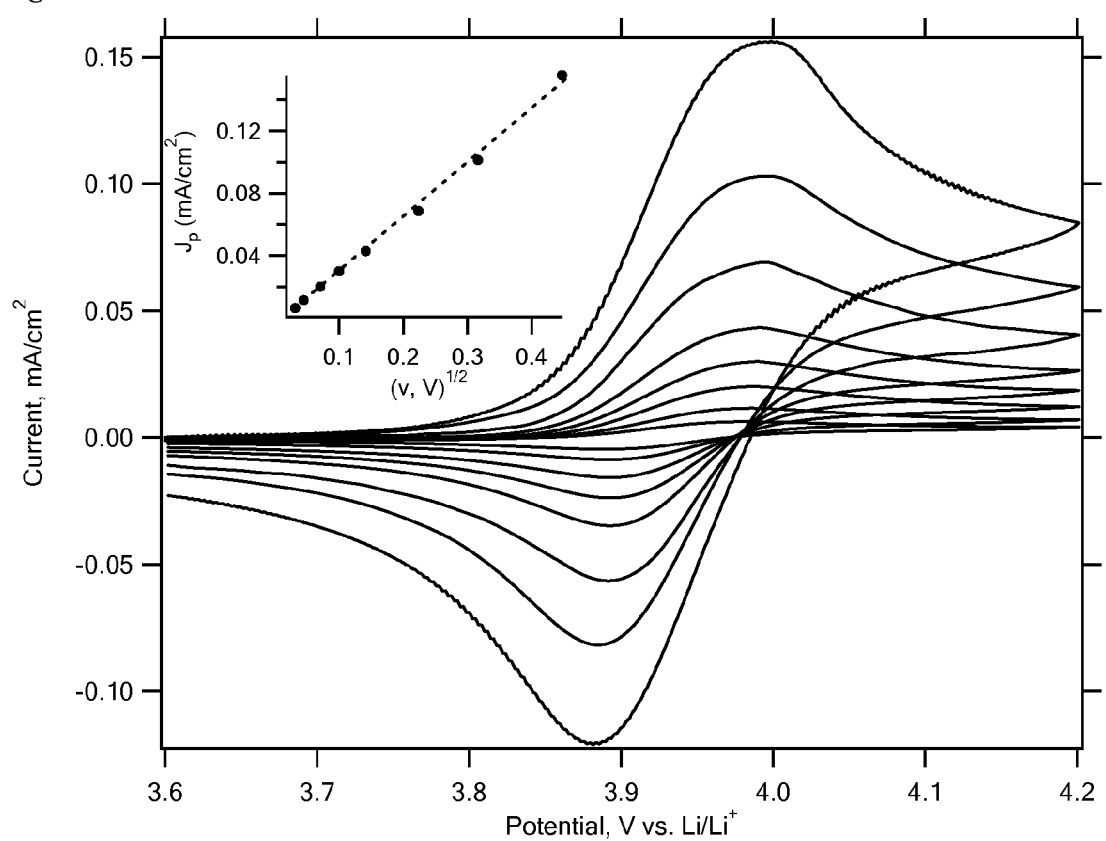

FIG. 6 shows the cyclic voltammograms of DW adsorbed on LiMnPO$_4$ electrode. The behavior is similar to that on TiO$_2$ (cf. FIG. 4). In other words, LiMnPO$_4$ behaves like an inert (insulating) support, and molecular wiring towards oxidative delithiation of LiMnPO$_4$ is absent. This is understandable because the available redox potential of DW does not provide enough driving force for this reaction. By using the same evaluation routine as for TiO$_2$ we can calculate the diffusion coefficient from the slope of $J_p$ vs. $v^{1/2}$ (inset in FIG. 3) to be: $D_+ = 3 \cdot 10^{-9}$ cm$^2$/s$^{Ref\ 23}$. Interestingly, the cross-surface charge transport is ca. three times faster on LiMnPO$_4$ compared to TiO$_2$. This might be due to different surface morphology: whereas TiO$_2$ is a mesoporous material with statistically sintered 20-nm particles, the LiMnPO$_4$ consists of platelets ca. 200 nm in size, exposing the (010) faces on which the DW molecules can be assembled in a more organized way.

Although LiMnPO$_4$ is intact for molecular wiring (cf. FIG. 6), this effect is well expressed for LiFePO$_4$ olivine. FIG. 7A shows that a constant current flows at potentials above ca. 4.1 V. This plateau ("wiring current") is indicative for subsequent chemical reaction of the oxidized molecule (DW$^+$) with LiFePO$_4$ olivine causing its oxidative delithiation:

$$DW^+ + LiFePO_4 \rightarrow DW + Li^+ + FePO_4 \quad (2)$$

Interestingly, at faster scanning (200 mV/s) we may trace also the parent peaks of the DW redox couple, indicating that a fast molecular charge transfer reaction foreruns the interfacial hole injection into LiFePO$_4$. This kind of behaviour was not yet reported for molecular wiring or targeting of LiFePO$_4$. At slower scanning (20 mV/s, the molecular couple is not seen, and the voltammogram is dominated by the wiring current only. Both curves in FIG. 7A were acquired on fresh (non-treated) electrodes with roughly identical film's mass and surface area.

The surface coverage of LiFePO$_4$ with DW was analyzed spectrophotometrically and found to be 0.5 nmol/cm$^2$ (referred to the BET surface area of the electrode material), which is ca. 3 molecules/nm$^2$. This surface coverage is similar to that found for TiO$_2$ (vide ultra) and also comparable to that reported for the BMABP/LiFePO$_4$ system: 2.5 molecules/nm$^2$. Hence, the surface concentration of 2-3 molecules/nm$^2$ seems to be representative for monolayer coverage for these relatively small organic molecules with one phosphonic anchor. Presumably, the gradual delithiation of LiFePO$_4$ during repeated cycling from faster to slower scan rates might, actually, caused this effect too. Also shown on FIG. 7A is the behaviour of a blank LiFePO$_4$ film, which was not treated by DW. This electrode shows negligible electrochemical activity, as it is expected for a stoichiometric olivine, free from any carbon additives.

The voltammogram of partly delithiated electrode also shows more clearly that the wiring current is independent of the scan rate. FIG. 7B presents the voltammogram of an electrode, which was delithiated by repeated cycling, followed by one-hour charging at a constant potential of 4.2 V. The total passed charge was equivalent to ca. 15% of the theoretical charge capacity (170 mAh/g) of the used electrode. This electrode still exhibits the wiring effect, albeit the current for the 15%-delithiated electrode is ca. 40 times smaller than for the fresh electrode.

To get more insight into the fading of wiring activity, we have tested the behaviour of a fresh DW/LiFePO$_4$ electrode during ten subsequent CV scans at various scan rates. FIG. 8 summarizes the data for six electrodes; each plot at the given scan rate starts from a virgin electrode, while care was taken that all six electrodes had roughly identical film mass and area ($\approx$3 mg/cm$^2$). The molecular couple is still seen at the scan rate of 100 mV/s (cf. FIGS. 7 and 8). At the scan rates of 50 and 20 mV/s, we can trace an almost ideal molecular wiring behaviour, which is also apparent at slower scanning of partly charged electrodes. Nevertheless, slower scanning of a virgin electrode confirms that the wiring current drops significantly already at the time scale of cyclic voltammetry.

Figure 9:
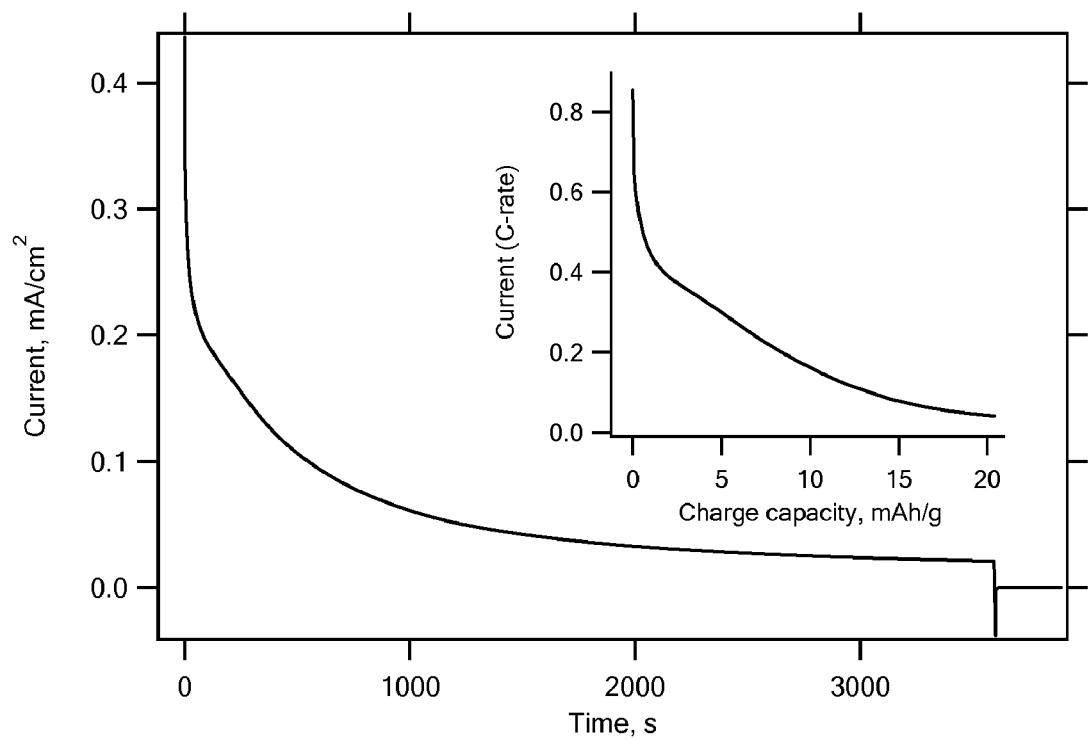

FIG. 9 shows potential-step chronoamperometry test of a virgin DW-wired LiFePO$_4$ electrode. The current is not linear with $t^{-1/2}$, in other words the Cotrell-like behaviour is not traceable like for redox wiring of molecules on insulating supports (TiO$_2$). This is quite understandable, because in our case, the chronoamperometry is not controlled by diffusion, but by effects associated with the interfacial molecular wiring. Consequently, chronoamperometry helps to evaluate the wiring effect itself. During one-hour of constant charging at 4.2 V, we can pass a charge equivalent to ca. 12% of the total faradic capacity of the electrode material (170 mAh/g). This is more explicitly shown in FIG. 9-*inset*, where the current is expressed in a way conventional in battery testing. Obviously, charging rates of ca. C/2-C/10 are applicable for fresh electrodes and shallow charging.

Our data confirm that the wiring current is primarily controlled by the state of the DW/LiFePO$_4$ interface, which is most easily described as the level of the LiFePO$_4$ charging. This is further presented on FIG. 10, which compiles the data from cyclic voltammetry (plots like those in FIGS. 4 and 5) and chronoamperometry (FIG. 9). Voltammetric data (points) and chronoamperometry data (line) are reasonably matching. The wiring current seems to be roughly inversely proportional to the level of discharge, this is represented by a dashed line in FIG. 9.

The performance of a DW-wired LiFePO$_4$ olivine is far from that of the up-to-date carbon-coated LiFePO$_4$ cathodes for Li-ion batteries. But it is certainly interesting, at least academically, that a monolayer of molecules can carry currents, needed for charging of conventional batteries. We may reasonably expect further performance upgrade, if the particle size of the electrode material gets smaller.

FIGURE CAPTIONS

FIG. 1. Vis-NIR spectrum of the working solution of single wall carbon nanotubes dispersed by Ru-complex, Z-907Na/SWCNT (curve A) and pure Ru-complex Z-907Na (curve B). The concentration of Ru-complex was 6×10$^{-4}$ mol/L in both cases, the optical cell thickness was 2 mm.

FIG. 2. Pure LiFePO$_4$ electrode (with 5% PVDF; total film mass 1.54 mg/cm$^2$) treated by dip coating into 6·10$^{-4}$ mol/L solution of Z-907Na (left chart) or Z-907Na/SWCNT (right chart). Scan rates (in mV/s): 50, 20, 10, 5 for curves from top to bottom. Electrolyte solution is 1 M LiPF$_6$ in EC/DMC.

FIG. 3. Left chart: Cyclic voltammograms (scan rates 0.1 mV/s); electrolyte solution 1 M LiPF$_6$ in EC/DMC. Curve A: Electrode from LiFePO$_4$ surface-derivatized with Z-907Na/SWCNT (2.04 mg/cm$^2$). Curve B (dashed line): electrode from carbon-coated LiFePO$_4$ (Nanomyte BE-20, 2.28 mg/cm$^2$). Curve C: Electrode from LiFePO$_4$ surface-derivatized with pyrene butanoic acid/SWCNT (1.83 mg/cm$^2$). The current scale is multiplied by a factor of 10 for curve B.

Right chart: Galvanostatic charge/discharge cycle; electrolyte solution 1 M LiPF$_6$ in EC/DMC. Curve A: Electrode from LiFePO$_4$ surface-derivatized with Z-907Na/SWCNT (2.04 mg/cm$^2$) charging rate C/5. Curve B (dashed line): electrode from carbon-coated LiFePO$_4$ (Nanomyte BE-20, 2.28 mg/cm$^2$) charging rate C/50.

FIG. 4: Cyclic voltammograms of DW adsorbed on mesoporous TiO$_2$ film. Scan rates (in mV/s): 200, 100, 50, 20, 10, 5, 2, 1. Inset shows the forward peak current as a function of the square root of the scan rate.

FIG. 5: Cyclic voltammograms of DW adsorbed on mesoporous TiO$_2$ film. Scan rate 1 mV/s. Ten successive scans were accumulated.

FIG. 6: Cyclic voltammograms of DW adsorbed on LiMnPO$_4$ electrode. Scan rates (in mV/s): 200, 100, 50, 20, 10, 5, 2, 1. Inset shows the forward peak current as a function of the square root of the scan rate.

Figure 7:
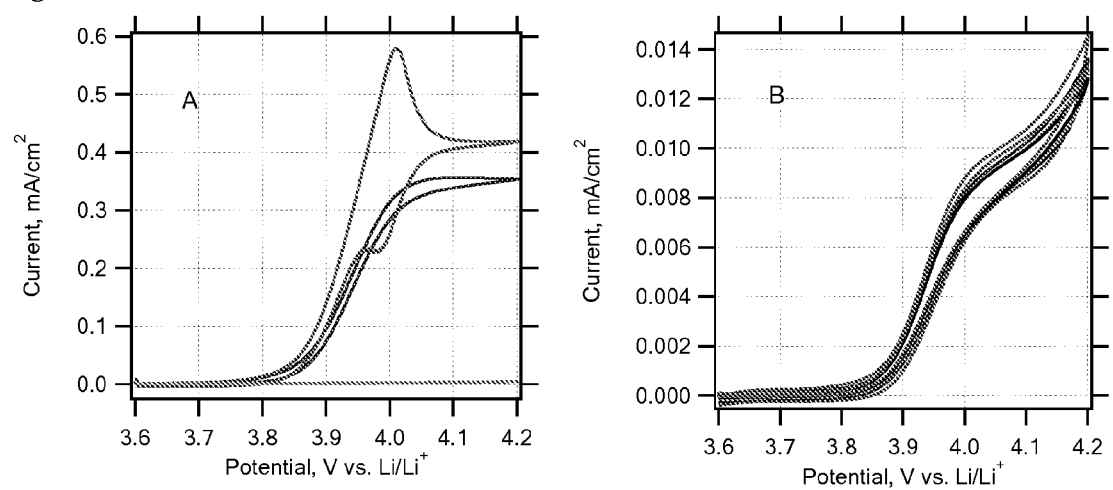
Figure 8:
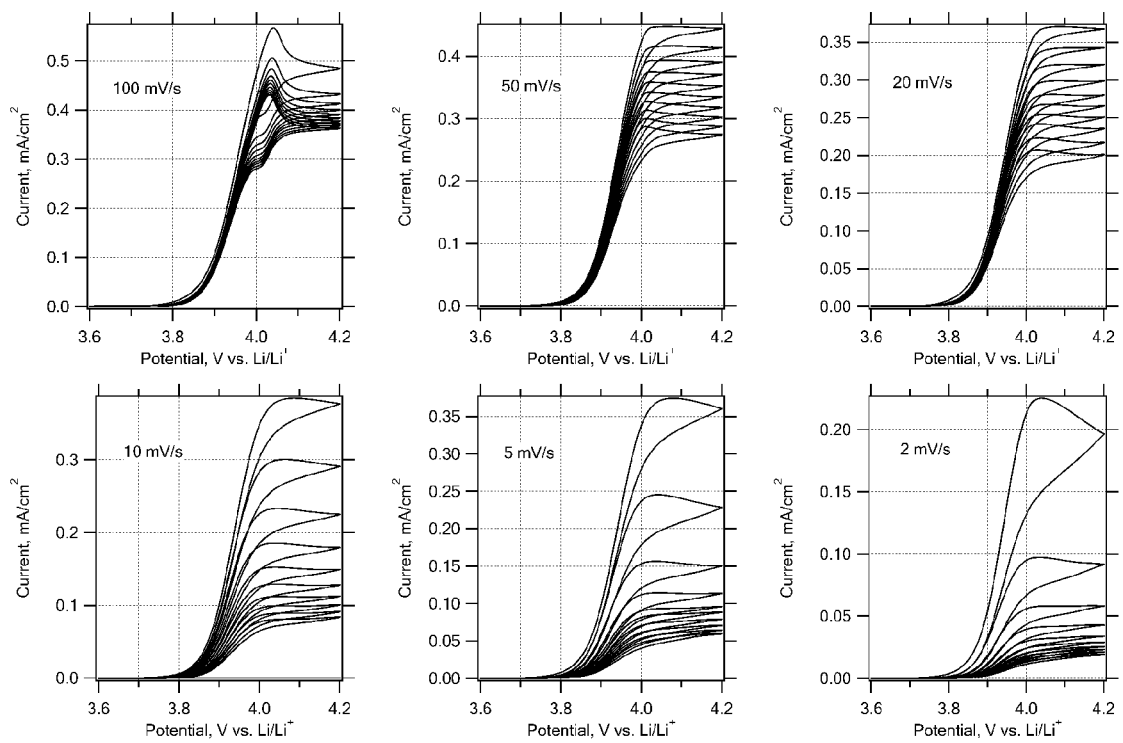

FIG. 7: Cyclic voltammograms of DW-wired LiFePO$_4$ electrode. A: Fresh electrode: first scan at 200 mV/s (red), 20 mV/s (blue). For comparison, green line is for LiFePO$_4$ electrode without DW (20 mV/s). B: Used electrode (after 15% charge): scan rates (in mV/s): 20 (red), 10 (blue), 5 (green), 2 (black), 1 (magenta).

FIG. 8: Cyclic voltammograms of DW-wired LiFePO$_4$ electrode. Ten successive scans were accumulated for each given scan rate.

FIG. 9: Potential-step chronoamperometry of DW-wired LiFePO$_4$ electrode. The potential step was from 3.5 V to 4.2 V (3600 s) to 3.5 V (300 s). Inset shows the same data recalculated in C-rate charging vs. charge capacity of the actual electrode assuming 170 mAh/g as the theoretical charge capacity.

Figure 10:
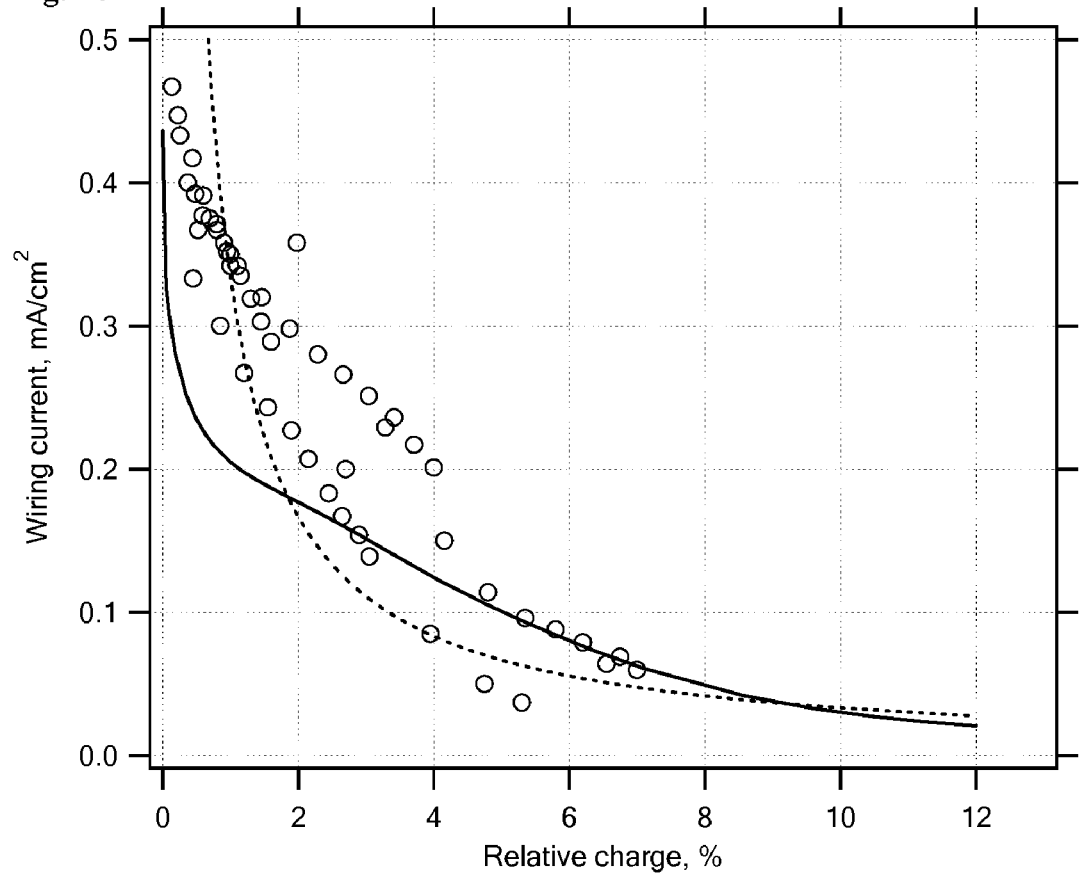

FIG. 10: Compilation of the measured wiring currents as a function of the level of charging assuming 170 mAh/g (theoretical charge capacity) as the reference 100% charge. Points: data from CV at varying scan rates between 1 to 200 mV/s. Curve: data from potential-step chronoamperometry (3.5-4.2 V (3600 s)-3.5 V). Also shown is a model hyperbola (dashed line) assuming the wiring current were inversely proportional to the relative charge.

REFERENCE LIST

[1] A. K. Padhi, K. S. Nanjundasawamy, J. B. Goodenough, *J. Electrochem. Soc.* 1997, 144, 1188-1194.
[2] C. Delacourt, L. Laffont, R. Bouchet, C. Wurm, J. B. Leriche, M. Mocrette, J. M. Tarascon, C. Masquelier, *J. Electrochem. Soc.* 2005, 153, A913-A921.
[3] P. S. Herle, B. Ellis, N. Coombs, L. F. Nazar, *Nature Mat.* 2004, 3, 147-152.
[4] M. Yonemura, A. Yamada, Y. Takei, N. Sonoyama, R. Kanno, *J. Electrochem. Soc.* 2004, 151, A1352-A1356.
[5] F. Zhou, K. Kang, T. Maxisch, G. Ceder, D. Morgan, *Solid State Comm.* 2004, 132, 181-186.
[6] B. Ellis, L. K. Perry, D. H. Ryan, L. F. Nazar, *J. Am. Chem. Soc.* 2006, 128.
[7] R. Dominko, M. Bele, M. Gaberseck, M. Remskar, D. Hanzel, J. M. Goupil, S. Pejovnik, J. Jamnik, *J. Power Sources* 2006, 153, 274-280.
[8] T. Nakamura, Y. Miwa, M. Tabuchi, Y. Yamada, *J. Electrochem. Soc.* 2006, 153, A1108-A1114.
[9] J. Ma, Z. Qin, *J. Power Sources* 2005, 148, 66-71.
[10] N. H. Kwon, T. Drezen, I. Exnar, I. Teerlinck, M. Isono, M. Grätzel, *Electrochem. Solid State Lett.* 2006, 9, A277-A280.
[11] A. Yamada, M. Hosoya, S. C. Chung, Y. Kudo, K. Hinokuma, K. Y. Liu, Y. Nishi, *J. Power Sources* 2003, 119-121, 232-238.
[12] G. Li, H. Azuma, M. Tohda, *Electrochem. Solid State Lett.* 2002, 5, A135-A137.
[13] C. Delacourt, P. Poizot, M. Morcrette, J. M. Tarascon, C. Masquelier, *Chem. Mater.* 2004, 16, 93-99.
[14] S. Y. Chung, J. T. Bloking, Y. M. Chiang, *Nature Mat.* 2002, 1, 123-128.
[15] D. Wang, H. Li, Z. Wang, X. Wu, Y. Sun, X. Huang, L. Chen, *J. Solid State Chem.* 2004, 177, 4582-4587.
[16] P. Wang, B. Wenger, R. Humphry-Baker, J. Moser, J. Teuscher, W. Kantlehner, J. Mezger, E. V. Stoyanov, S. M. Zakeeruddin, M. Grätzel, *J. Am. Chem. Soc.* 2005, 127, 6850-6856.
[17] D. A. Britz, A. N. Khlobystov, *Chem. Soc. Rev.* 2006, 35, 637-659.
[18] S. W. Boettcher, M. H. Bartl, J. G. Hu, G. D. Stucky, *J. Am. Chem. Soc.* 2005, 127, 9721-9730.
[19] Q. Wang, S. M. Zakeeruddin, M. K. Nazeeruddin, R. Humphry-Baker, M. Grätzel, *J. Am. Chem. Soc.* 2006, 128, 4446-4452.
[20] Q. Wang, N. Evans, S. M. Zekeeruddin, I. Exnar, M. Grätzel, *J. Am. Chem. Soc.* 2006.
[21] P. Wang, S. M. Zakeeruddin, P. Comte, R. Charvet, R. Humphry-Baker, M. Grätzel, *J. Phys. Chem. B* 2003, 107, 14336-14341.
[22] M. K. Nazeeruddin, P. Pechy, T. Renouard, S. M. Zakeeruddin, R. Humphry-Baker, P. Comte, P. Liska, L. Cevey, E. Costa, V. Shklover, L. Spiccia, G. B. Deacon, C. A. Bignozzi, M. Grätzel, *J. Am. Chem. Soc.* 2001, 123, 1613-1624.
[23] L. Kavan, I. Exnar, J. Cech and M. Grätzel, *Chem. Mater.*, (2007).
[24] J. R. Dahn, J. Jiang, L. Moshurchak, M. D. Fleischauer, C. Buhrmester and L. J. Krause, *J. Electrochem. Soc.,* 152, A1283 (2005).

The invention claimed is:

1. A rechargeable electrochemical cell with improved energy density, comprising a first and second compartment separated by a separating element permeable to lithium ions, the first compartment comprising a cathodic lithium insertion material and the second compartment comprising an anodic lithium insertion material, wherein there is: (i) a single wall carbon nanotube (SWCNT) attached with a p type redox active compound in the first compartment, (ii) a SWCNT attached with n-type redox active compound in the second compartment or (iii) combination thereof, wherein the lithium insertion materials have a particle size from 10 nm to 10 micrometers.

2. A rechargeable electrochemical cell according to claim 1, wherein the first and second compartment have said SWCNT attached with said p and n type redox active compound.

3. The rechargeable electrochemical cell according to claim 2, wherein the cathodic lithium insertion material is selected from doped or non-doped oxides LiMO$_2$ where M is Co, Ni, Mn, Fe, W, V, or mixture thereof; LiMPO$_4$ where M is Fe, Co, Mn, Ni, V, Cr or combination thereof; spinels and mixed spinels.

4. The rechargeable electrochemical cell according to claim 2, wherein the anodic lithium insertion material is selected from carbon, TiO$_2$, Li$_4$Ti$_5$O$_{12}$, SnO$_2$, SnO, Si or combination thereof.

5. The rechargeable electrochemical cell according to claim 1, wherein the p or n type redox active compound is attached to the SWCNT, either by covalent bonding or non-covalent bonding or electrostatic interaction.

6. The rechargeable electrochemical cell according to claim 5, wherein the p or n type redox active compound is an organic compound is:

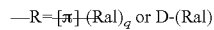

wherein —[π]— represents schematically the π system of the aforesaid substituent, Ral represents an aliphatic substituent with a saturated chain portion bound to the π system, and wherein q represents an integer from 1 to 3, indicating that —[π]— may bear more than one substituent Ral, wherein at least one of substituents —R, —R$_1$, —R$_2$ is of formula (1), (2) or (3)

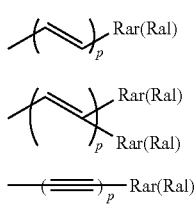

wherein p is an integer from 0 to 20, wherein Rar is a H or monocyclic or oligocyclic aryl from C$_6$ to C$_{22}$, wherein -Ral is —R1 or —O—R1 or —N(R1)$_2$ or —NHR1 or

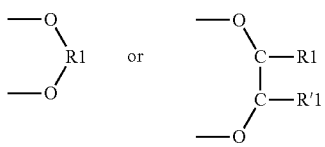

wherein R1, R'1 are same or different from —CH$_2$PO$_3$H$_2$, —CH$_2$CO$_2$H, —CH$_2$SO$_3$H, —CH$_2$CONHOH, —CH$_2$PO$_4$H$_2$, —CH$_2$SO$_4$H$_2$, x≧0, and 0<n<20 and D is selected from benzol, naphtaline, indene, substituted triarylamine, fluorene, phenantrene, anthracene, triphenylene, pyrene, pentalene, perylene, indene, azulene, heptalene, biphenylene, indacene, phenalene, acenaphtene, fluoranthene, and heterocyclic compounds pyridine, pyrimidine, pyridazine, quinolizidine, quinoline, isoquinoline, quinoxaline, phtalazine, naphthyridine, quinazoline, cinnoline, pteridine, indolizine, indole, isoindole, carbazole, carboline, acridine, phenanthridine, 1,10-phenanthroline, thiophene, thianthrene, oxanthrene, and derivatives thereof.

7. The rechargeable electrochemical cell according to claim 6, wherein D is:

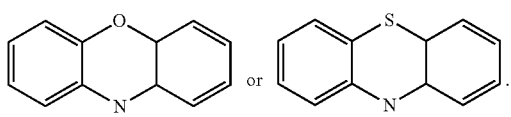

8. The rechargeable electrochemical cell according to claim 5, wherein the redox active compound is:

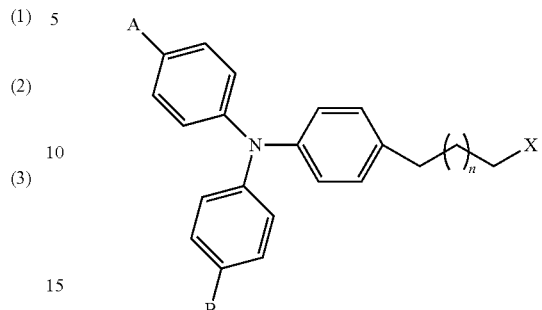

where n is 0 to 20,

X is PO$_3$H$_2$ or CO$_2$H or SO$_3$H or CONHOH or PO$_4$H$_2$,

A is F or Cl or Br I or NO$_2$ or COOR or alkyl (C$_1$ to C$_{20}$) or CF$_3$ or COR or OCH$_3$ or H, and B is F or Cl or Br I or NO$_2$ or COOR or alkyl (C$_1$ to C$_{20}$) or CF$_3$ or COR or OCH$_3$.

9. The rechargeable electrochemical cell according to claim 5, wherein the redox active compound is:

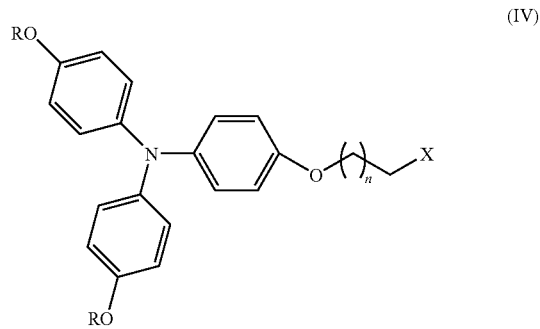

where n is 0 to 20,

R is H or C$_1$ to C$_{20}$, and

X is PO$_3$H$_2$ or CO$_2$H or SO$_3$H or CONHOH or PO$_4$H$_2$.

10. The rechargeable electrochemical cell according to claim 5, wherein the redox active compound is of the formula (V) to (X):

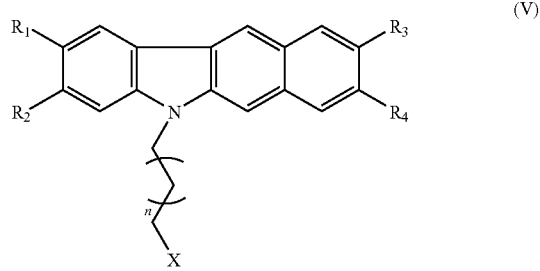

-continued

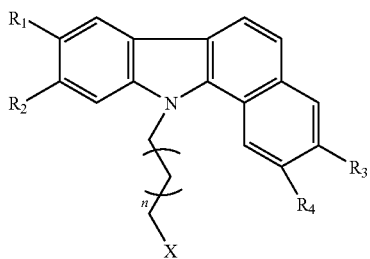
(VI)

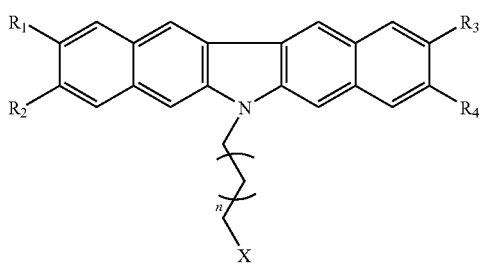
(VII)

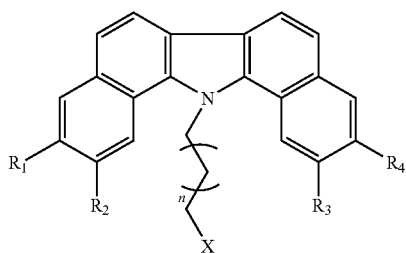
(VIII)

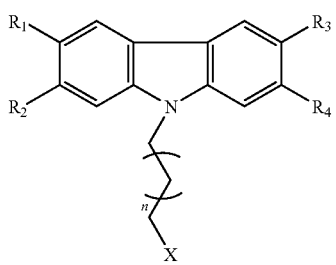
(IX)

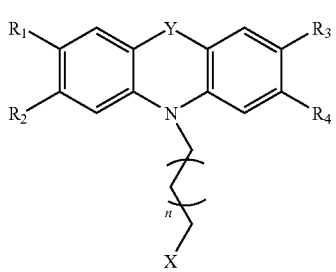
(X)

where n is 0 to 20,
X is $PO_3H_2$ or $CO_2H$ or $SO_3H$ or CONHOH or $PO_4H_2$,
Y is N, O or S, and
$R_1$, $R_2$, $R_3$, or $R_4$ are each independently F or Cl or Br I or $NO_2$ or COOR or alkyl ($C_1$ to $C_{20}$) or $CF_3$ or COR or $OCH_3$ or H.

11. The rechargeable electrochemical cell according to claim 5, wherein the redox active compound is of the formula (XI):

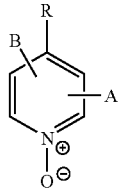
(XI)

wherein A and B are the same or different and are H, OR, Cl, Br, F, I, $NO_2$, $CF_3$, or $COCF_3$;
R is H or $(CH_2)_p$-$E_n$-$(CH_2)_m$-Acc, wherein p is 0 to 24, linear or branched or with cycles; n is 0 to 24, m is 0 to 24, linear or branched or with cycles; E is —CH=CH—, or —C≡C—, or —OCH$_2$CH$_2$—; and Acc is $PO_3H_2$ or $CO_2H$ or $SO_3H$ or CONHOH or $PO_4H_2$ or $SO_4H_2$.

12. The rechargeable electrochemical cell according to claim 5, wherein the redox active compound is of the formula (XII):

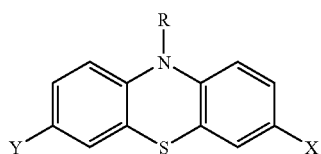
(XII)

wherein X and Y are the same or different and are H, OR, Cl, Br, F, I, $NO_2$, $CF_3$, $COCF_3$, and R is H or $(CH_2)_p$-$E_n$-$(CH_2)_m$-Acc, where p is 0 to 24, linear or branched or with cycles, n is 0 to 24, m is 0 to 24, linear or branched or with cycles, E is —CH=CH—, or —C≡C—, or —OCH$_2$CH$_2$—, and Acc is $PO_3H_2$ or $CO_2H$ or $SO_3H$ or CONHOH or $PO_4H_2$ or $SO_4H_2$.

13. The rechargeable electrochemical cell according to claim 5, wherein the redox active compound is of the formula (XIII):

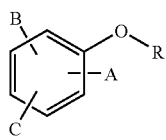
(XIII)

wherein A, B and C are the same or different and are H, OR, Cl, Br, F, I, $NO_2$, $CF_3$, $COCF_3$, linear or branched alkyl group from 1 to 20 carbon atoms and R is H or $(CH_2)_p$-$E_n$-$(CH_2)_m$-Acc, where p is 0 to 24, linear or branched or with cycles; n is 0 to 24, m is 0 to 24, linear or branched or with cycles.

14. The rechargeable electrochemical cell according to claim 5, wherein the p or n type redox active compound is 12-(2,5-di-tert-butyl-4-methoxyphenoxy)dodecyl phosphonic acid.

15. The rechargeable electrochemical cell according to claim 5, wherein the p or n type redox active compound is a metal complex of the formula (XIV) or (XV):
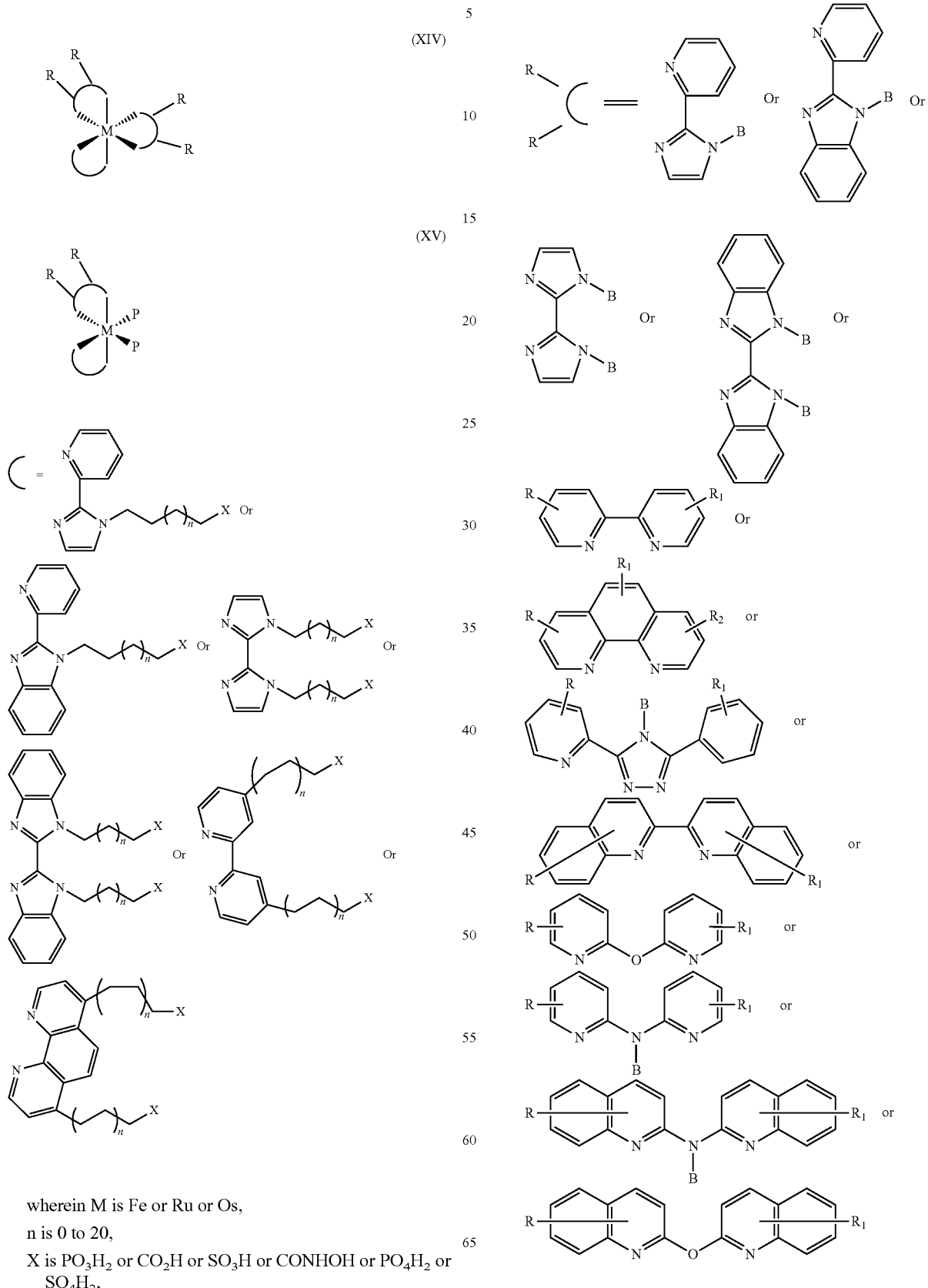
wherein M is Fe or Ru or Os,
n is 0 to 20,
X is $PO_3H_2$ or $CO_2H$ or $SO_3H$ or CONHOH or $PO_4H_2$ or $SO_4H_2$,
P is F or Cl or Br or I or $NO_2$ or CN or NCSe or NCS or NCO, wherein B is alkyl ($C_1$ to $C_{20}$) or H, R, $R_1$, $R_2$ is the same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is an alkyl ($C_1$ to $C_{20}$) or H) or comprises an additional π system located in conjugated relationship with the primary π system, the said substituent is of the type

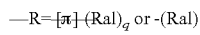

wherein —[π]— represents schematically the π system of the aforesaid substituent, Ral represents an aliphatic substituent with a saturated chain portion bound to the π system, and wherein q represents an integer from 1 to 3, indicating that —[π]— may bear more than one substituent Ral, wherein at least one of substituents —R, —$R_1$, —$R_2$ is of formula (1), (2) or (3)

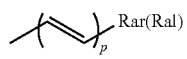 (1)

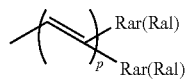 (2)

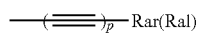 (3)

wherein p is an integer from 0 to 20, wherein Rar is a H or monocyclic or oligocyclic aryl from $C_6$ to $C_{22}$, wherein -Ral is —R1 or —O—R1 or —N(R1)$_2$ or —NHR1 or

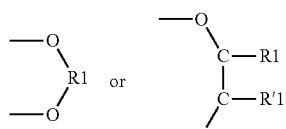

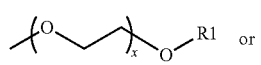

wherein R1, R'1 are same or different and are —$CH_2PO_3H_2$, —$CH_2CO_2H$, —$CH_2SO_3H$, —$CH_2CONHOH$, —$CH_2PO_4H_2$, —$CH_2SO_4H_2$, $x \geq 0$, and $0 < n < 20$, wherein the —R, —$R_1$, —$R_2$ of formulas (1), (2) or (3), are the same or different and are —H, —OH, —$R_3$, —$OR_3$, COOH, $COCF_3$, CN, Br, Cl, F, I, $CF_3$, or —$N(R_3)_2$, wherein $R_3$ is a linear or branched alkyl of 1 to 20 carbon atoms.

16. The rechargeable electrochemical cell according to claim 5, wherein the n or p type redox active compound is a metal complex of the formula (XVI):

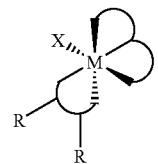 (XVI)

wherein M is Fe or Ru or Os and

X is F or Cl or Br or I or $NO_2$ or CN or NCSe or NCS or NCO

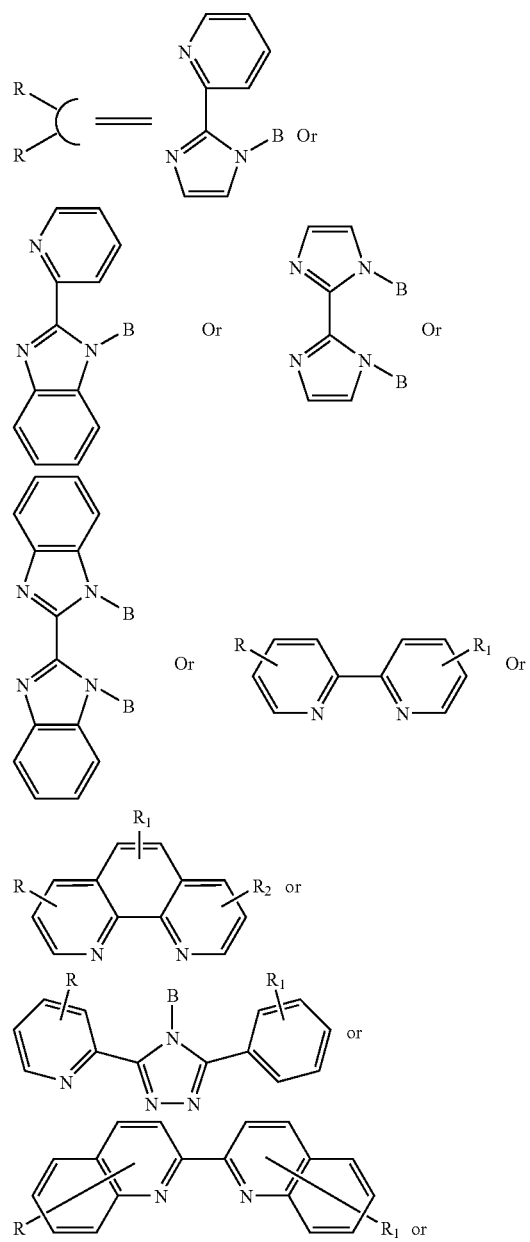

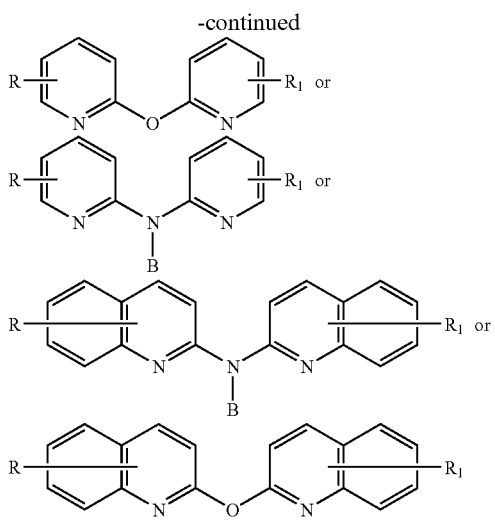

wherein B is a linear or branched alkyl ($C_1$ to $C_{20}$) or H

R, $R_1$, $R_2$ are the same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or a linear or branched alkyl ($C_1$ to $C_{20}$) or H (where $R_3$ is an alkyl ($C_1$ to $C_{20}$) or H) or comprises an additional π system located in conjugated relationship with the primary π system, the said substituent is of the type —R=—[π]—(Ral)$_q$ or -(Ral)

wherein —[π]— represents schematically the π system of the aforesaid substituent, Ral represents an aliphatic substituent with a saturated chain portion bound to the π system, and wherein q represents an integer from 1 to 3, indicating that —[π]— may bear more than one substituent Ral, wherein at least one of substituents —R, —$R_1$, —$R_2$ is of formula (1), (2) or (3)

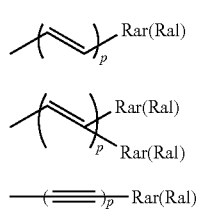

(1)

(2)

(3)

wherein p is an integer from 0 to 20,
wherein Rar is a H or monocyclic or oligocyclic aryl from $C_6$ to $C_{22}$,
wherein -Ral is —R1 or —O—R1 or —N(R1)$_2$ or —NHR1 or

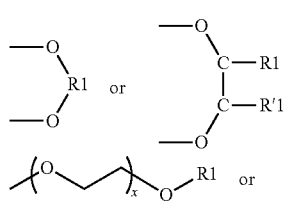

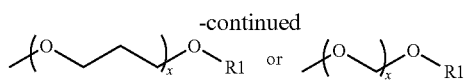

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20, wherein the other one(s) of substituent(s) —R, —$R_1$, —$R_2$ are the same or a different substituent of formula (1), (2) or (3), or are selected from —H, —OH, —$R_3$, —$OR_3$, COOH, COCF$_3$, CN, Br, Cl, F, I, CF$_3$, or —N($R_3$)$_2$, wherein $R_3$ is a linear or branched alkyl of 1 to 20 carbon atoms,

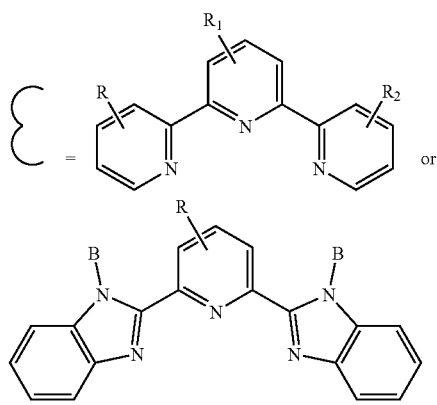

wherein B is alkyl ($C_1$ to $C_{20}$) or H
R, $R_1$, $R_2$ may be same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H or comprises said additional π system located in conjugated relationship with the primary π system.

17. The rechargeable electrochemical cell according to claim 5, wherein the p or n type redox active compound is a metal complex of the formula (XVII) as follows:

(XVII)

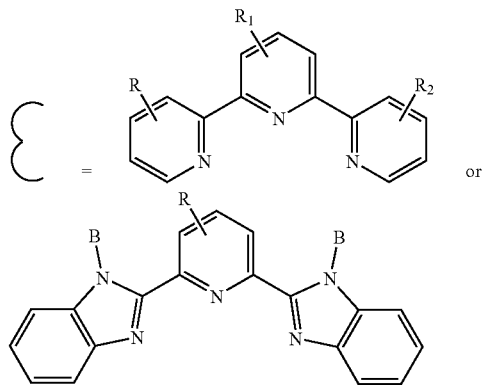

wherein M is Fe or Ru or Os,

B=alkyl ($C_1$ to $C_{20}$) or H,

R, $R_1$, $R_2$ may be same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H or comprises an additional π system located in conjugated relationship with the primary π system, the said substituent is of the type

wherein —[π]— represents schematically the c system of the aforesaid substituent, Ral represents an aliphatic substituent with a saturated chain portion bound to the π system, and wherein q represents an integer from 1 to 3, indicating that —[π]— may bear more than one substituent Ral, wherein at least one of substituents —R, —$R_1$, —$R_2$ is of formula (1), (2) or (3)

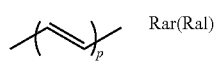 (1) Rar(Ral)

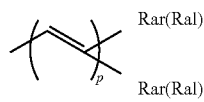 (2) Rar(Ral)  Rar(Ral)

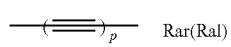 (3) Rar(Ral)

wherein p is an integer from 0 to 20, wherein Rar is a H or monocyclic or oligocyclic aryl from $C_6$ to $C_{22}$, wherein -Ral is —R1 or —O—R1 or —N(R1)$_2$ or —NHR1 or

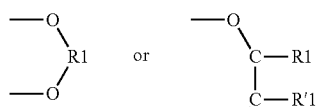

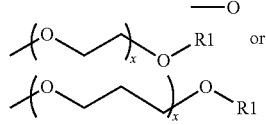

wherein R1, R'1 are same or different from —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20, wherein the other one(s) of substituent(s) —R, —$R_1$, —$R_2$ are the same or a different substituent of formula (1), (2) or (3), and are —H, —OH, —$R_3$, —$OR_3$, COOH, $COCF_3$, CN, Br, Cl, F, I, $CF_3$, or —N($R_3$)$_2$, wherein $R_3$ is a linear or branched alkyl of 1 to 20 carbon atoms.

18. The rechargeable electrochemical cell according to claim 5, wherein the p or n type redox active compound is a metal complex of the formula (XVIII):

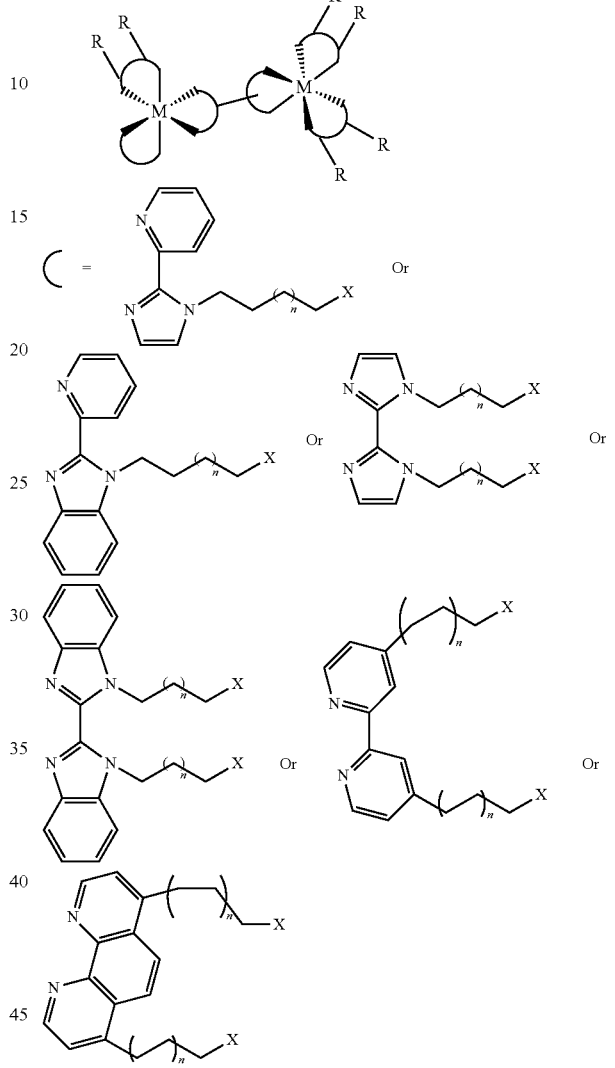

(XVIII)

M is Fe or Ru or Os, n is 0 to 20,

X is $PO_3H_2$ or $CO_2H$ or $SO_3H$ or CONHOH or $PO_4H_2$ or $SO_4H_2$,

P is F or Cl or Br or I or $NO_2$ or CN or NCSe or NCS or NCO,

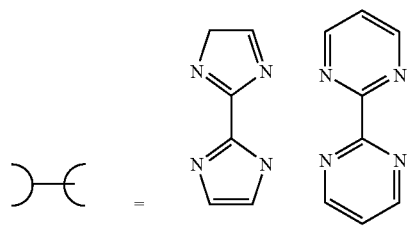

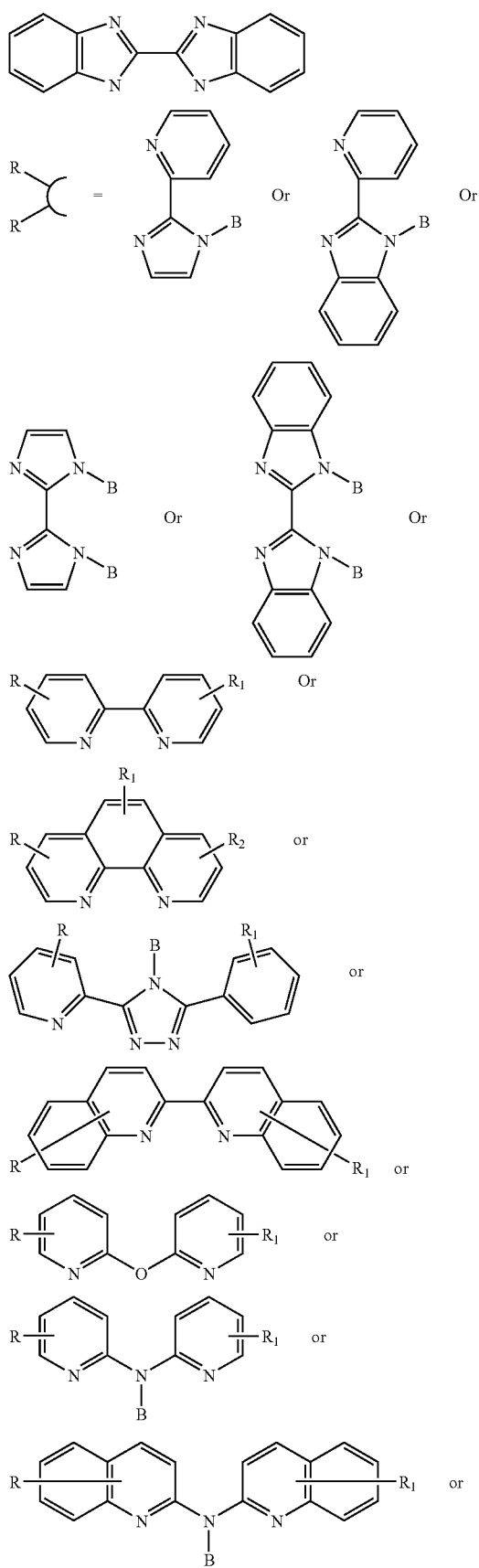

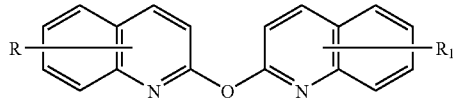

wherein B is alkyl ($C_1$ to $C_{20}$) or H

R, $R_1$, $R_2$ may be same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H or comprises an additional π system located in conjugated relationship with the primary π system, the said substituent is of the type —R=[π]—(Ral)$_q$ or -(Ral)

wherein —[π]— represents schematically the π system of the aforesaid substituent, Ral represents an aliphatic substituent with a saturated chain portion bound to the π system, and wherein q represents an integer from 1 to 3, indicating that —[π]— may bear more than one substituent Ral, wherein at least one of substituents —R, —$R_1$, —$R_2$ is of formula (1), (2) or (3)

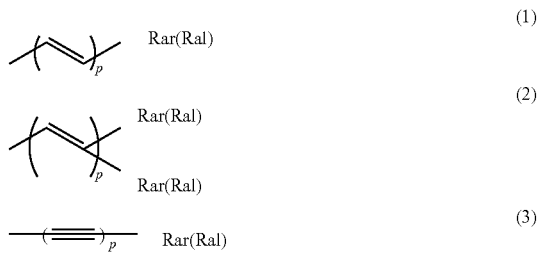

wherein p is an integer from 0 to 20, wherein Rar is a H or monocyclic or oligocyclic aryl from $C_6$ to $C_{22}$, wherein -Ral is —R1 or —O—R1 or —N(R1)$_2$ or —NHR1 or

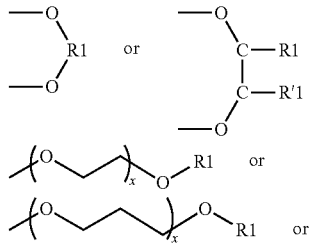

wherein R1, R'1 are the same or different and are —$CH_2PO_3H_2$, —$CH_2CO_2H$, —$CH_2SO_3H$, —$CH_2CONHOH$, —$CH_2PO_4H_2$, —$CH_2SO_4H_2$, x≧0, and 0<n<20, wherein the other one(s) of substituent(s) —R, —$R_1$, —$R_2$ are the same or a different substituent of formula (1), (2) or (3), and are —H, —OH, —$R_3$, —$OR_3$, COOH, $COCF_3$, CN, Br, Cl, F, I, $CF_3$, or —N($R_3$)$_2$, wherein $R_3$ is a linear or branched alkyl of 1 to 20 carbon atoms.

19. The rechargeable electrochemical cell according to claim 5, wherein the redox active compound is a metal complex of the formula (XIX):

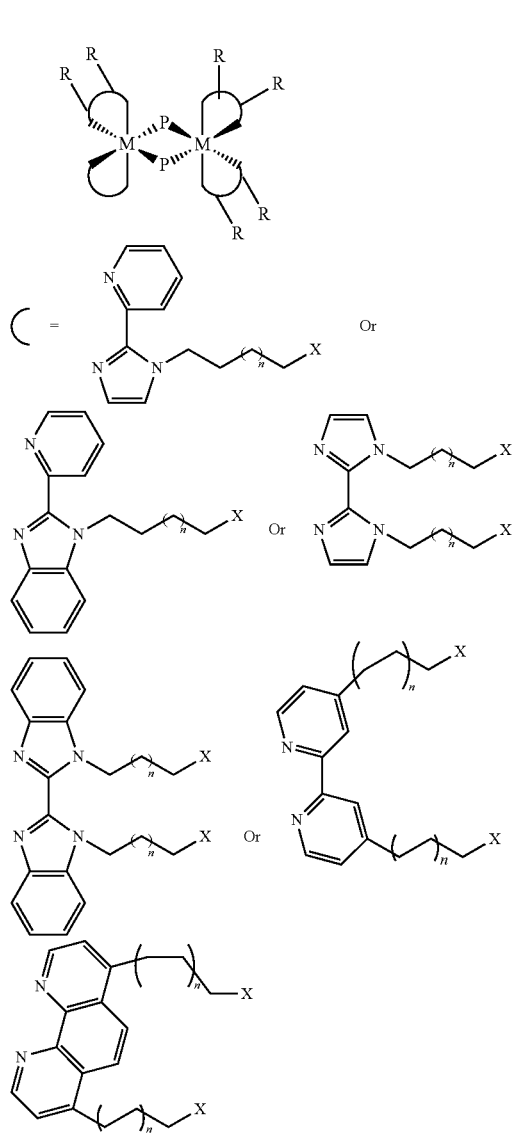

(XIX)

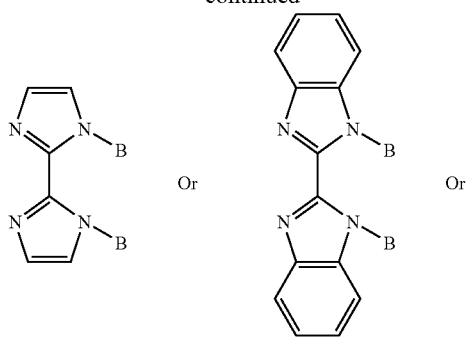

Or

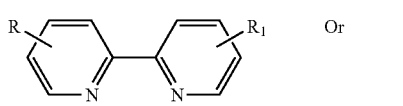

Or

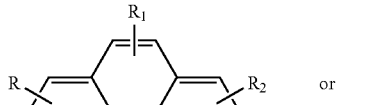

or

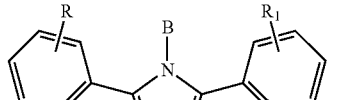

or

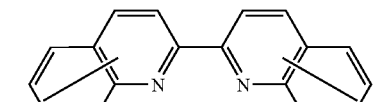

or

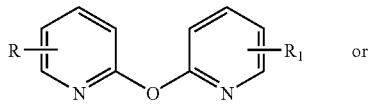

or

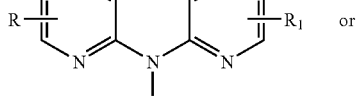

or

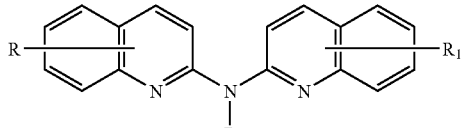

or

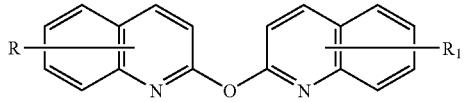

wherein M is Fe or Ru or Os,
n is 0 to 20,
X is $PO_3H_2$ or $CO_2H$ or $SO_3H$ or CONHOH or $PO_4H_2$ or $SO_4H_2$,
P is CN or NCSe or NCS or NCO and

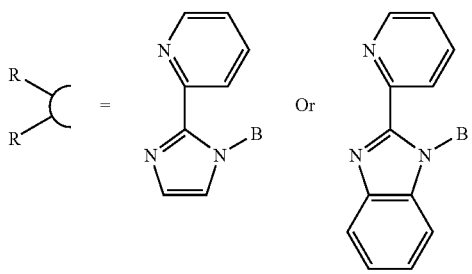

Or wherein B is alkyl ($C_1$ to $C_{20}$) or H,
R, $R_1$, $R_2$ may be the same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H or comprises the above said π system located in conjugated relationship with the primary π system.

20. The rechargeable electrochemical cell according to claim 5, wherein the p or n type redox active compound is a metal complex of the formula (XX) as follows:
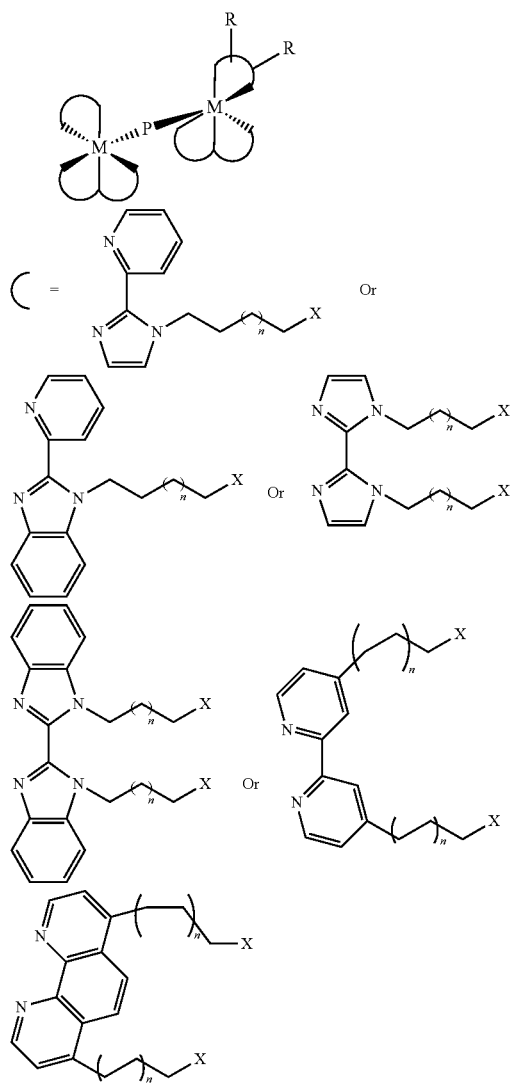
wherein M is Fe or Ru or Os,
n is 0 to 20,
X is $PO_3H_2$ or $CO_2H$ or $SO_3H$ or CONHOH or $PO_4H_2$ or $SO_4H_2$,
P is CN or NCSe or NCS or NCO or pyrazine,
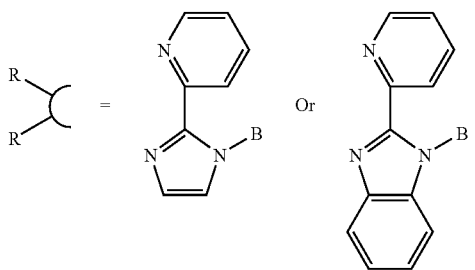
-continued
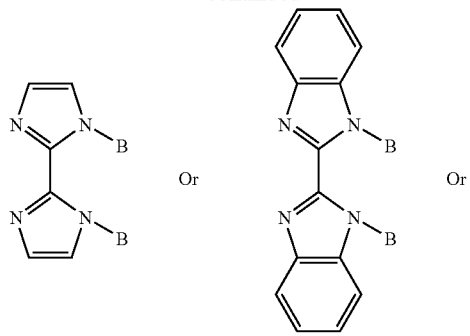
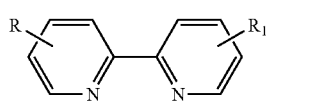
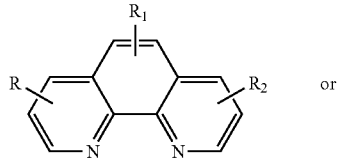
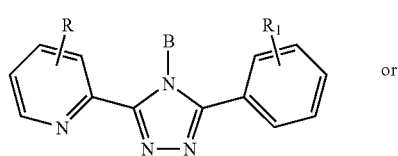
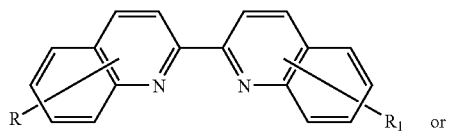
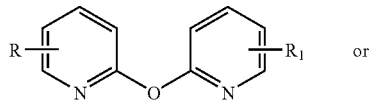
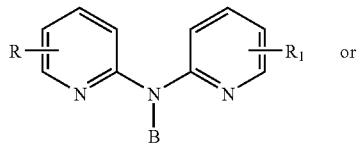
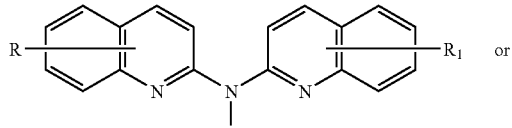
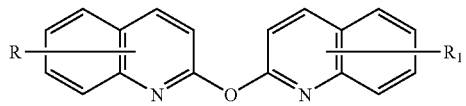

wherein B is alkyl ($C_1$ to $C_{20}$) or H

R, $R_1$, $R_2$ may be the same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H or comprises said additional π system located in conjugated relationship with the primary π system and

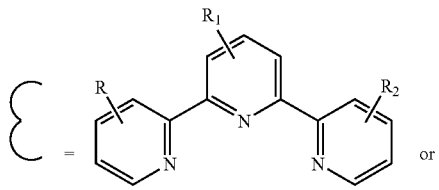 or

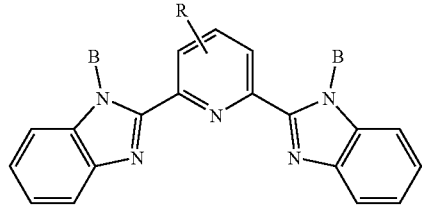

wherein B=alkyl ($C_1$ to $C_{20}$) or H,

R, $R_1$, $R_2$ may be same or different and are $COOR_3$ or $PO_3R_3$ or $SO_3R_3$ or $CONR_3OR_3$ or $SO_4R_3$ or $COR_3$ or $CF_3$ or $COCF_3$ or $OR_3$ or $NO_2$ or F or Cl or Br or I or $NR_3$ or alkyl ($C_1$ to $C_{20}$) or H where $R_3$ is an alkyl ($C_1$ to $C_{20}$) or H or comprises the above additional said π system located in conjugated relationship with the primary π system.

* * * * *